United States Patent
Ledroz et al.

(10) Patent No.: US 10,689,969 B2
(45) Date of Patent: *Jun. 23, 2020

(54) SYSTEM AND METHOD FOR PROVIDING A CONTINUOUS WELLBORE SURVEY

(71) Applicant: Gyrodata, Incorporated, Houston, TX (US)

(72) Inventors: Adrián Guillermo Ledroz, Houston, TX (US); Rafael Perez Castro, Macaé (BR); John Lionel Weston, Christchurch (GB)

(73) Assignee: Gyrodata, Incorporated, Houston, TX (US)

( * ) Notice: Subject to any disclaimer, the term of this patent is extended or adjusted under 35 U.S.C. 154(b) by 432 days.

This patent is subject to a terminal disclaimer.

(21) Appl. No.: 15/452,075

(22) Filed: Mar. 7, 2017

(65) Prior Publication Data

US 2017/0175517 A1 Jun. 22, 2017

Related U.S. Application Data

(63) Continuation-in-part of application No. 14/446,140, filed on Jul. 29, 2014, now Pat. No. 10,077,648.

(51) Int. Cl.
*E21B 47/02* (2006.01)
*E21B 47/022* (2012.01)
(Continued)

(52) U.S. Cl.
CPC .............. *E21B 47/022* (2013.01); *E21B 7/04* (2013.01); *E21B 7/10* (2013.01); *G01C 19/02* (2013.01); *G01C 21/16* (2013.01)

(58) Field of Classification Search
CPC ........ E21B 47/022; E21B 47/04; E21B 47/10; G01C 10/02
See application file for complete search history.

(56) References Cited

U.S. PATENT DOCUMENTS

| 5,390,748 A | 2/1995 | Goldman |
| 5,452,518 A | 9/1995 | DiPersio |

(Continued)

FOREIGN PATENT DOCUMENTS

| EP | 684490 A2 | 11/1995 |
| WO | 9928594 A1 | 6/1999 |

OTHER PUBLICATIONS

PCT International Search Report and Written Opinion; PCT/US2018/040468; dated Nov. 12, 2018.
(Continued)

*Primary Examiner* — John Fitzgerald
(74) *Attorney, Agent, or Firm* — Pramudji Law Group PLLC; Ari Pramudji

(57) ABSTRACT

Systems and methods are provided for producing a continuous survey of a previously drilled portion of a wellbore. The method includes receiving a plurality of stationary survey measurements taken at a corresponding plurality of locations along the portion of the wellbore. The method further includes receiving at least one continuous survey including a plurality of continuous survey measurements taken between a pair of stationary survey measurements of the plurality of stationary survey measurements. The method further includes combining the plurality of stationary survey measurements and the plurality of continuous survey measurements to produce the continuous survey of the portion of the wellbore.

20 Claims, 12 Drawing Sheets

(51) Int. Cl.
    *G01C 19/02*     (2006.01)
    *E21B 7/04*     (2006.01)
    *E21B 7/10*     (2006.01)
    *G01C 21/16*     (2006.01)

(56) References Cited

U.S. PATENT DOCUMENTS

| | | | |
|---|---|---|---|
| 5,519,668 | A | 5/1996 | Montaron |
| 5,657,547 | A | 8/1997 | Uttecht et al. |
| 5,806,195 | A | 9/1998 | Uttecht et al. |
| 5,821,414 | A | 10/1998 | Noy et al. |
| 6,179,067 | B1 | 1/2001 | Brooks |
| 6,209,391 | B1 | 4/2001 | Dallas |
| 6,347,282 | B2 | 2/2002 | Estes et al. |
| 6,405,808 | B1 | 6/2002 | Edwards et al. |
| 6,529,834 | B1 | 3/2003 | Estes et al. |
| 6,633,816 | B2 | 10/2003 | Shirasaka et al. |
| 6,807,487 | B2 | 10/2004 | Khan |
| 6,877,241 | B2 | 4/2005 | Barr et al. |
| 6,957,580 | B2 | 10/2005 | Ekseth et al. |
| 7,066,284 | B2 | 6/2006 | Wylie et al. |
| 7,117,605 | B2 | 10/2006 | Ekseth et al. |
| 7,225,550 | B2 | 6/2007 | Ekseth et al. |
| 7,225,879 | B2 | 6/2007 | Wylie et al. |
| 7,234,539 | B2 | 6/2007 | Wright et al. |
| 7,341,117 | B2 | 3/2008 | Wylie et al. |
| 7,350,410 | B2 | 4/2008 | Ekseth et al. |
| 7,571,777 | B2 | 8/2009 | Wylie et al. |
| 7,650,269 | B2 | 1/2010 | Rodney |
| 7,669,656 | B2 | 3/2010 | Wright et al. |
| 7,789,171 | B2 | 9/2010 | Grayson et al. |
| 8,011,446 | B2 | 9/2011 | Wylie et al. |
| 8,292,005 | B2 | 10/2012 | Grayson et al. |
| 8,579,044 | B2 | 11/2013 | Allen et al. |
| 8,596,385 | B2 | 12/2013 | Benson et al. |
| 10,077,648 | B2 * | 9/2018 | Ledroz .................. G01C 19/02 |
| 2002/0060570 | A1 | 5/2002 | Shirasaka et al. |
| 2002/0188407 | A1 | 12/2002 | Khan |
| 2003/0037963 | A1 | 2/2003 | Barr et al. |
| 2004/0149431 | A1 | 8/2004 | Wylie et al. |
| 2005/0241855 | A1 | 11/2005 | Wylie et al. |
| 2007/0187146 | A1 | 8/2007 | Wylie et al. |
| 2008/0087423 | A1 | 4/2008 | Wylie et al. |
| 2008/0164063 | A1 | 7/2008 | Grayson et al. |
| 2009/0078413 | A1 | 3/2009 | Tubel et al. |
| 2009/0308616 | A1 | 12/2009 | Wylie et al. |
| 2010/0193246 | A1 | 8/2010 | Grayson et al. |
| 2012/0245850 | A1 | 9/2012 | Bang et al. |
| 2013/0161096 | A1 * | 6/2013 | Benson ................ E21B 7/04 175/26 |
| 2013/0282290 | A1 | 10/2013 | Weston et al. |
| 2015/0240620 | A1 | 8/2015 | Bang et al. |
| 2015/0240622 | A1 | 8/2015 | Bang et al. |
| 2015/0369042 | A1 | 12/2015 | Samuel et al. |
| 2016/0032709 | A1 | 2/2016 | Ledroz et al. |
| 2017/0044890 | A1 * | 2/2017 | Clark .................. E21B 47/0006 |
| 2018/0128101 | A1 * | 5/2018 | Ledroz .................. E21B 49/00 |
| 2018/0306944 | A1 * | 10/2018 | Ledroz ................. G01V 11/002 |

OTHER PUBLICATIONS

EPO Examination Report; EP 15178946.8; dated Nov. 5, 2018.
PCT International Search Report and Written Opinion; PCT/US2018/021175; dated Jun. 26, 2018.
EPO Examination Report; EP 15178946.8; dated Dec. 19, 2017.
Schlumberger; PZIG 675 Specifications / Data Sheet; 2013. https://www.slb.com/~/media/Files/drilling/product_sheets/mwd/pathfinder_mwd/pzig_675_ps.pdf.
EPO Examination and Search Report and Opinion; EP 15178946.8; dated Apr. 25, 2016.
Weston, et al.; New Gyro Drilling Technology Delivers Accurate Azimuth and Real-Time Quality Control for All Well Trajectories; IADC/SPE Drilling Conference and Exhibition; Mar. 4, 2014.
Brown; High-Angle Gyro-While-Drilling Technology Delivers an Economical Solution to Accurate Wellbore Placement and Collision Avoidance in High-Density Multilateral Pad Drilling in The Canadian Oil Sands; IADC/SPE Drilling Conference and Exhibition; Jan. 1, 2012.
Uttecht, et al.; Survey Accuracy is Improved by a New, Small OD Gyro; World Oil; Mar. 1983.

* cited by examiner

SYSTEM AND METHOD FOR PROVIDING A CONTINUOUS WELLBORE SURVEY

CROSS-REFERENCE TO RELATED APPLICATIONS

This application is a continuation-in-part of co-pending U.S. patent application Ser. No. 14/446,140, filed Jul. 29, 2014, which is herein incorporated by reference.

BACKGROUND

Field of the Application

The present application relates generally to surveys of wellbores, and more particularly, to systems and methods for using continuous survey measurements between stationary gyrocompassing survey measurements to produce a continuous wellbore survey for wellbores for oil field and gas field exploration and development.

Description of the Related Art

A survey tool configured to be used in a wellbore can comprise at least one gyroscopic sensor configured to provide at least one data signal indicative of the orientation of the survey tool relative to the rotation axis of the Earth. For example, the at least one gyroscopic sensor can comprise a rate gyroscope (e.g., a spinning gyroscope, typically with the spin axis substantially parallel to the wellbore). The rate gyroscope undergoes precession as a consequence of the Earth's rotation. The rate gyroscope is configured to detect the components of this precession and to generate at least one corresponding data signal indicative of the orientation of the rate gyroscope's spin axis relative to the Earth's axis of rotation. By measuring this orientation relative to the Earth's axis of rotation, the rate gyroscope can determine the orientation of the survey tool relative to true north. Such rate gyroscopes can be used in a gyrocompassing mode while the survey tool is relatively stationary. In certain systems, the survey tool (e.g., a measurement-while-drilling or MWD survey tool) can be part of a steerable drilling tool, and can be used in a gyrosteering mode while drilling is progressing.

SUMMARY

In one aspect of the disclosure, a method is provided for producing a continuous survey of a previously drilled portion of a wellbore. The method comprises receiving a plurality of stationary survey measurements taken at a corresponding plurality of locations along the portion of the wellbore. The method further comprises receiving at least one continuous survey comprising a plurality of continuous survey measurements taken between a pair of stationary survey measurements of the plurality of stationary survey measurements. The method further comprises combining the plurality of stationary survey measurements and the plurality of continuous survey measurements to produce the continuous survey of the portion of the wellbore.

In another aspect of the disclosure, a method is provided for generating data for a continuous survey of a previously drilled portion of a wellbore. The method comprises taking a plurality of stationary survey measurements at a corresponding plurality of locations along the portion of the wellbore. The method further comprises taking at least one continuous survey comprising a plurality of continuous survey measurements between a pair of stationary survey measurements of the plurality of stationary survey measurements.

In another aspect of the disclosure, a wellbore survey system is provided. The system comprises at least one first survey tool configured to perform stationary survey measurements at a first level of performance. The system further comprises at least one second survey tool configured to perform continuous survey measurements at a second level of performance lower than the first level of performance.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Various configurations are depicted in the accompanying drawings for illustrative purposes, and should in no way be interpreted as limiting the scope of the systems or methods described herein. In addition, various features of different disclosed configurations can be combined with one another to form additional configurations, which are part of this disclosure. Any feature or structure can be removed, altered, or omitted. Throughout the drawings, reference numbers may be reused to indicate correspondence between reference elements.

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1A:
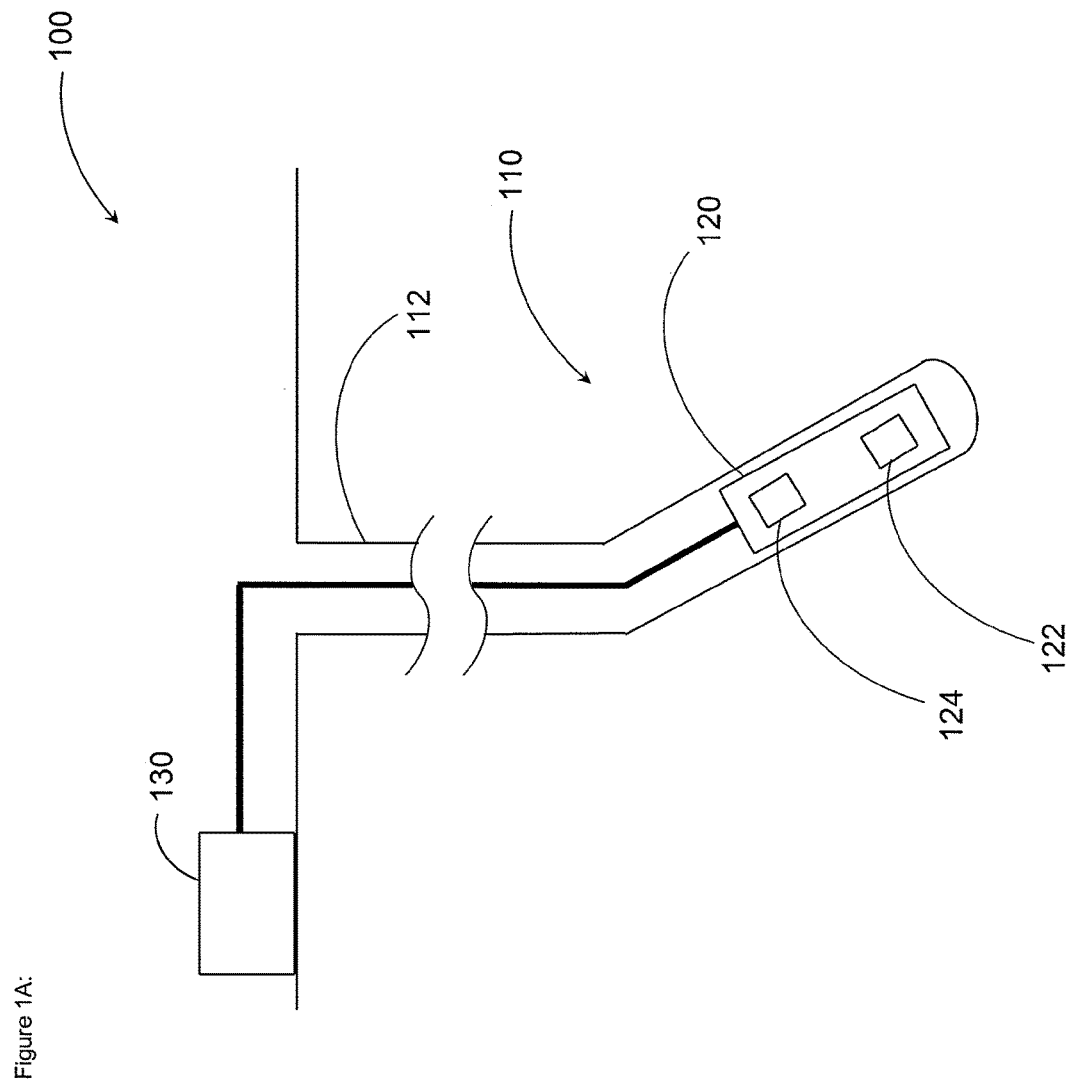
FIG. 1A schematically illustrates an example system in accordance with certain embodiments described herein.

Although certain configurations and examples are disclosed herein, the subject matter extends beyond the examples in the specifically disclosed configurations to other alternative configurations and/or uses, and to modifications and equivalents thereof. Thus, the scope of the claims appended hereto is not limited by any of the particular configurations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain configurations; however, the order of description should not be construed to imply that these operations are order-dependent. Additionally, the structures, systems, and/or devices described herein may be embodied as integrated components or as separate components. For purposes of comparing various configurations, certain aspects and advantages of these configurations are described. Not necessarily all such aspects or advantages are achieved by any particular configuration. Thus, for example, various configurations may be carried out in a manner that achieves or optimizes one advantage or group of advantages as taught herein without necessarily achieving other aspects or advantages as may also be taught or suggested herein.

In the discussion herein, attention is focused on certain embodiments in which systems and methods are used in conjunction with gyrocompassing survey measurements (e.g., gyroscopic measurements taken while the survey tool is substantially stationary to measure rotations due to the Earth's rotation). The systems and methods described herein may be used in conjunction with survey tools for taking certain types of static/gyrocompassing wellbore surveys, including, but not limited to, wireline survey tools, slick line survey tools (e.g., tools for surveys run on a wireline without communication to the surface), and drop survey tools.

The surveys of the previously drilled portion of the wellbore can be taken by a survey tool either as the survey tool is inserted into (e.g., an inrun survey) or extracted from (e.g., an outrun survey) the portion of the wellbore after the portion of the wellbore has been drilled. In addition, the surveys of the previously drilled portion of the wellbore can be taken during an outrun survey, for example, using sensors that are part of a gyro-while-drilling (GWD) drill string or a measurement-while-drilling (MWD) drill string that is used to drill the wellbore, and the sensors of the GWD or MWD drill string are used to take measurements while the drill string is extracted from the wellbore (as opposed to being used while the drill string is drilling the wellbore and being extended downward along the wellbore) after the portion of the wellbore has been drilled. In certain embodiments, the sensors used to take the plurality of continuous survey measurements are located in a portion of the drill string that rotates as drilling is performed.

As with other downhole measurement systems and methods, in certain embodiments described herein, the situation downhole is not known precisely, and failure of the survey tool to become totally static when measurement data are collected may degrade the accuracy of the survey. However, due to the measurements being taken of a previously drilled portion of the wellbore, the results of the analysis described herein are not available while the portion of the wellbore is being drilled. Instead, the results of the analysis described herein are available after the portion of the wellbore has been drilled but before further activity involving the portion of the wellbore.

For example, it can be desirable to accurately determine the true path or trajectory of a previously drilled wellbore, including portions of the wellbore having significant deviations from the predetermined plan for the wellbore path. Different drilling methods may result in more deviations than others (e.g., paths that have more tortuous trajectories than others), and detailed data regarding the wellbore path or trajectory which takes account of short-term perturbations in the wellbore path can be desirable for a number of reasons, including, but not limited to the identification of low-tortuosity sections for permanent installation of completion or production equipment, and the identification of high-tortuosity sections in which rod guide wear sleeve equipment is to be placed to increase rod and casing life and to reduce workover frequency. Furthermore, detailed knowledge of well tortuosity may help the evaluation of the drilling equipment and process, in particular the steering while drilling performance, and for extended reach drilling. In certain embodiments, the systems and methods described herein advantageously provide a very precise and detailed continuous survey of a previously drilled portion of a wellbore, taking account of "micro-tortuosity" of the wellbore trajectory.

Current gyroscopic survey techniques include stationary and continuous techniques. When taking a gyrocompassing survey measurement within a wellbore, it is desirable that the survey tool remains perfectly stationary with respect to the Earth while the data is collected. Being stationary ensures that the at least one gyroscopic sensor module of the survey tool is subject only to the rotational motion of the Earth while the measurements are being made. Stationary gyroscopic surveys typically have sequential gyrocompassing measurements taken at positions within the wellbore that are spaced from one another by pipe or stand length intervals (e.g., 30-90 feet), with these measurements being used to determine wellbore inclination and azimuth. Positional data can be derived by combining the angular information from the gyrocompassing measurements with measurements of the depth of the survey tool along the wellbore using a curve-fitting process to establish the trajectory of the wellbore. Continuous gyroscopic surveys are typically implemented by measuring the changes in inclination and azimuth at more frequent intervals along the wellbore (e.g., one foot), and the absolute inclination and azimuth values can be derived by summing the incremental changes from a known initial orientation. The initial orientation can be established at a reference down-hole position using at least one gyrocompassing survey, or at a reference surface position using fore sighting methods or other sources of attitude data that can be made available above-ground, including, but not limited to, satellite navigation data.

Continuous gyroscopic surveys, in which individual survey stations are taken at frequent intervals (e.g., successive positions spaced from one another by distances along the wellbore in a range between one foot and five feet), are subject to measurement drifts which can propagate and increase in size over long wellbore sections, giving rise to significant azimuth and positional inaccuracies. One existing method of offsetting the effects of such survey measurement drift is to perform drift corrections based on the comparison of inrun survey measurements (e.g., survey measurements taken while the survey tool is moved downward along the wellbore) and outrun survey measurements (e.g., survey measurements taken while the survey tool is moved upward along the wellbore) taken at common positions in the wellbore. An alternative technique is to conduct gyrocompassing surveys at intervals along the wellbore path and to use the resulting information to initialize successive continuous survey sections over shorter depth intervals. In such techniques, the length intervals between these successive continuous survey sections are in a range from 500 to 600 meters, corresponding to approximately 20 minutes duration for typical wireline run operations.

In certain embodiments described herein, a method is provided which combines frequent static survey measurements (e.g., at intervals of 90 feet) with continuous survey measurements taken between the successive static survey measurements. For example, certain embodiments described herein can be used for battery run operations, in which the survey tool traverses the wellbore on a slick line. However, certain embodiments described herein are applicable for any other wireline survey technique as well.

FIG. 1A schematically illustrates an example system 100 in accordance with certain embodiments described herein. The system 100 comprises a tool string 110 configured to be within a wellbore 112 and comprising at least one survey tool 120 configured to perform survey measurements. The system 100 further comprises at least one processor 130 configured to receive signals from the at least one survey tool 120 and to operate in accordance with certain embodiments described herein.

The at least one survey tool 120 can comprise at least one gyro-while-drilling (GWD) survey tool, at least one measurement-while-drilling (MWD) survey tool, or both. In certain embodiments, as schematically illustrated in FIG. 1A, the at least one survey tool 120 can comprise one survey tool 120 comprising at least one gyroscopic sensor module 122 and at least one accelerometer module 124. In certain such embodiments, the gyroscopes and accelerometers of the one survey tool 120 can be used to perform a combination of the stationary survey measurements and the continuous survey measurements, as described more fully below.

Figure 1B:
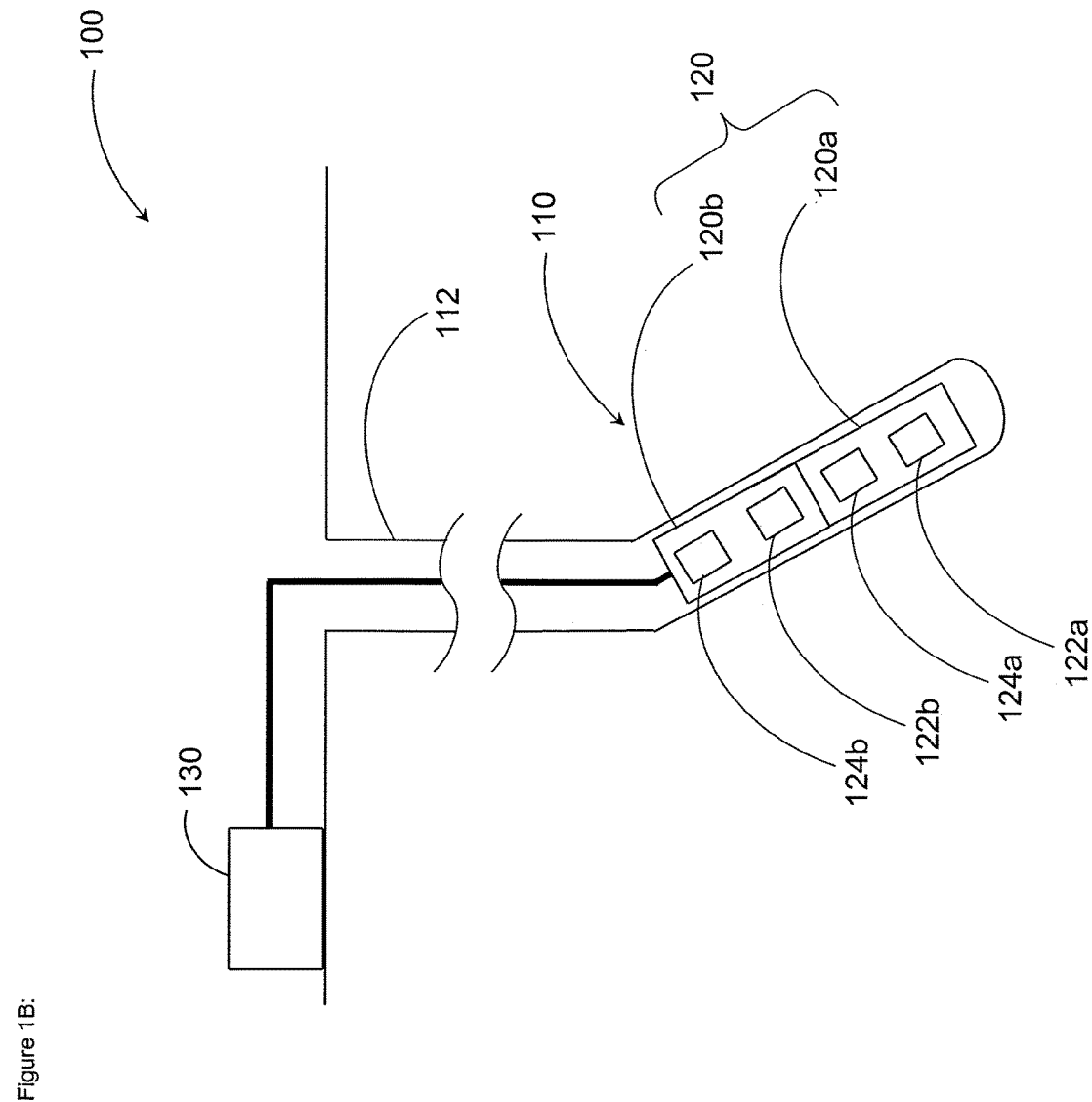
FIG. 1B schematically illustrates another example system in accordance with certain embodiments described herein.

FIG. 1B schematically illustrates an example system 100 in which the at least one survey tool 120 comprises a first survey tool 120a and a second survey tool 120a in accordance with certain embodiments described herein. In certain such embodiments, one of the first survey tool 120a and the second survey tool 120a can be used to perform the stationary survey measurements (e.g., high performance gyrocompassing measurements). The other one of the first survey tool 120a and the second survey tool 120a can be used to perform the continuous survey measurements (e.g., lower grade measurements), keeping track of inclination and azimuth changes between the stationary survey measurements, as described more fully below. The stability and repeatability of the gyroscopic measurements are examples of parameters that can be used in determining the level of performance of a downhole gyrocompassing survey system. For example, gyrocompassing measurements can be characterized as being high performance when the combination of all gyroscopic measurement errors is less than 0.1 degree per hour. Using sensors that provide lower grade measurements (e.g., with measurement uncertainties in a range of 5-10 degrees per hour), it can become more difficult to achieve the desired level of measurement stability and repeatability for precision surveying. In certain other embodiments, the continuous survey measurements can be performed using a survey tool that has the same or higher accuracy than does the survey tool used to perform the stationary survey measurements.

The at least one survey tool 120 comprises at least one gyroscopic sensor module 122 configured to generate signals indicative of measurements of the rotation rate to which the at least one gyroscopic sensor module 122 is exposed. In the example system 100 of FIG. 1B, the at least one gyroscopic sensor module 122 comprises at least one gyroscopic sensor module 122a (e.g., dedicated to stationary survey measurements) of the first survey tool 120a and at least one gyroscopic sensor module 122b (e.g., dedicated to continuous survey measurements) of the second survey tool 120a.

The at least one gyroscopic sensor module 122 can comprise one or more gyroscopes that are dedicated to stationary survey measurements of the Earth's rotation vector (e.g., gyrocompassing survey measurements). For example, the at least one gyroscopic sensor module 122 can comprise one or more gyroscopes selected from the group consisting of: spinning wheel gyroscopes, optical gyroscopes, and Coriolis vibratory sensors (e.g., MEMS vibratory sensors). Example gyroscopic sensors compatible with embodiments described herein are described more fully in "Survey Accuracy is Improved by a New, Small OD Gyro," G. W. Uttecht, J. P. deWardt, World Oil, March 1983; U.S. Pat. Nos. 5,657,547, 5,821,414, and 5,806,195. These references are incorporated in their entireties by reference herein. Other examples of gyroscopic sensors are described by U.S. Pat. Nos. 6,347,282, 6,957,580, 7,117,605, 7,225,550, 7,234,539, 7,350,410, and 7,669,656 each of which is incorporated in its entirety by reference herein. The at least one gyroscopic sensor module 122 is advantageously capable of providing measurements of turn rate to the desired accuracy (e.g., in a range from 0.01°/hour to 0.05°/hour). The at least one gyroscopic sensor module 122 is advantageously sufficiently small to be accommodated in a down hole tool (e.g., within the confines of a 1¾-inch pressure case), capable of operating over the expected temperature range (e.g., −20° Celsius (C.) to +150° C., or greater), and capable of surviving the down hole vibration and shock environment that may be encountered within the wellbore.

The at least one gyroscopic sensor module 122 can further comprise one or more gyroscopes that are dedicated to continuous measurements of changes in orientation in addition to changes of the Earth's rotation vector. For example, the at least one gyroscopic sensor module 122 can comprise one or more MEMS gyroscopes, or other gyroscopes compatible with measuring angular changes in inclination and azimuth over the relatively short periods of time (e.g., one second) that the at least one survey tool 120 would take to move between successive stationary survey positions (e.g., 90 feet). The performance specifications for these gyroscopes are much less demanding, for example, a rate measurement bias stability in the range of 5-10°/hour is adequate. Gyroscopic sensors configured to provide the continuous survey measurements can be relatively small and inexpensive to install in the at least one survey tool 120. In certain embodiments, the one or more gyroscopes dedicated to continuous survey measurements can be installed alongside the one or more gyroscopes dedicated to stationary survey measurements (e.g., in a single tool 120). In certain other embodiments, the one or more gyroscopes dedicated to continuous survey measurements can be mounted in a second gyroscopic sensor module (e.g., gyroscopic sensor module 122b) that is separate but mechanically coupled (e.g., screwed) to a first gyroscopic sensor module (e.g., gyroscopic sensor module 122a) comprising the one or more gyroscopes dedicated to stationary survey measurements.

The at least one survey tool 120 further comprises at least one accelerometer module 124 configured to generate a second one or more signals indicative of measurements of the Earth's gravitation vector at the at least one accelerometer module 124. For example, the at least one accelerometer module 124 can comprise one or more accelerometers that are configured to measure the Earth's gravitation vector (e.g., a triad of accelerometers that provide signals indicative of three orthogonal components of the Earth's gravitation vector at the position of the at least one accelerometer module 124). In certain embodiments, the at least one accelerometer module 124 comprises one or more cross-axial accelerometers configured to sense two or more components of the Earth's gravitation vector.

In certain embodiments, the at least one accelerometer module 124 comprises two or more single-axis accelerometers, one or more two-axis accelerometers, and/or one or more three-axis accelerometers. Various types of accelerometer sensors are capable of providing a desired level of measurement accuracy and resolution compatible with certain embodiments described herein. Examples include, but are not limited to, quartz flexure accelerometer sensors and MEMS devices. The measurement range may be in excess of ±1 unit of standard gravity (g) (e.g., in a range between ±1.2 g and ±1.5 g). The accelerometer sensors are advantageously sufficiently small to be accommodated in a down hole tool (e.g., within the confines of a 1¾-inch pressure case), capable of operating over the expected temperature range (e.g., −20° C. to +150° C., or greater), and capable of surviving the down hole vibration and shock environment that may be encountered within the wellbore.

The resolution and precision of the at least one accelerometer sensors can depend on the time and the desired angular rate uncertainty. For example, for errors below a maximum error on the toolface rate of 0.05°/hour over 15 seconds, the at least one accelerometer can provide noise levels below 0.14 mG. An analog-to-digital system with a range of ±1.2 G and 16 bits can give a resolution of 0.036 mG/count, which can satisfy the desired noise levels. If the time is increased, the accelerometer uncertainty can be increased as well.

In certain embodiments, the at least one accelerometer module 124 comprises a plurality of accelerometers that is part of either a gyro-while-drilling (GWD) survey tool or a measurement-while-drilling (MWD) survey tool (e.g., for determining the inclination and tool face angles at various positions along the wellbore being surveyed). In certain other embodiments, the at least one accelerometer module 124 comprises different pluralities of accelerometers. For example, the at least one accelerometer module 124 can comprise one or more accelerometers that are dedicated to measurements of the Earth's gravitation vector during times at which the survey tool is used for gyrocompassing and one or more accelerometers that are not used for gyrocompassing.

The at least one processor 130 of the example system 100 of FIGS. 1A and 1B (e.g., one or more micro-processors, a standard personal computer) is configured to receive signals from the at least one gyroscopic sensor module 122 and from the at least one accelerometer sensor module 124 of the at least one survey tool 120. In certain embodiments, the at least one processor 130 is located at or above the Earth's surface (e.g., as schematically illustrated by FIGS. 1A and 1B), or is located within the survey tool 120 within the wellbore. In some embodiments, a portion of the at least one processor 130 is located at or above the Earth's surface, and another portion of the at least one processor 130 is located within the wellbore and is communicatively coupled to the portion at or above the Earth's surface.

The at least one processor 130 can comprise one or more hardware processors in communication with at least one computer-readable memory that stores software modules including instructions that are executable by the one or more hardware processors. The software modules can include one or more software modules configured to receive a first plurality of signals from the at least one gyroscopic module 122 of the survey tool 120, to receive a second plurality of signals from the at least one accelerometer sensor module 124 of the survey tool 120, and to use the first plurality of signals and the second plurality of signals in accordance with certain embodiments described herein. In certain embodiments, a non-transitory computer storage can be provided having stored thereon a computer program that instructs a computer system (e.g., the at least one processor 130) to perform one or more methods compatible with certain embodiments described herein.

In certain embodiments, the at least one processor 130 is part of a controller generally configured to control and/or monitor the operation of the tool string 110 or portions thereof, with the controller comprising hardware, software, or a combination of both hardware and software. For example, in certain embodiments in which the tool string 110 comprises a drill string, the at least one processor 130 can be further configured to determine the current orientation or the trajectory of the drill string within the wellbore 112. The at least one processor 130 can further be configured to communicate with a memory subsystem configured to store appropriate information, such as orientation data, data obtained from one or more sensor modules on the drill string, etc.

In certain embodiments, the at least one processor 130 provides a real-time processing analysis of the signals or data obtained from various sensors of the at least one survey tool 120. In certain such real-time processing embodiments, data obtained from the various sensor modules are analyzed in real-time. In certain embodiments, at least a portion of the data obtained from the various sensor modules is saved in memory for analysis by the at least one processor 130. The at least one processor 130 of certain such embodiments comprises sufficient data processing and data storage capacity to perform the real-time analysis. In certain other embodiments, rather than being performed in real-time, the analysis is performed after the surveys have been taken (e.g., post-processing), and the at least one processor 130 comprises sufficient data processing and data storage capacity to perform such post-processing of the previously-obtained surveys.

Certain embodiments described herein can advantageously determine the shape (e.g., trajectory) of the wellbore between successive stationary surveys using a relatively small and inexpensive continuous gyro system (e.g., MEMS gyros) which can include gyros that are of a significantly lower grade than those utilized to generate a definitive survey in conventional surveying systems and operations. Certain embodiments described herein are applicable for different modes of survey operation. For example, for systems that run on electrical wireline, both gyrocompassing and continuous data sets can be transmitted to the surface and a computer at the surface can combine the data appropriately. For another example, such processes can be carried out downhole and the final survey results can be transmitted to the surface. For slick line and drop tool operations, data can be downloaded at the surface after the tool has been retrieved from the wellbore, and data processing can then be performed at the surface.

Figure 2:
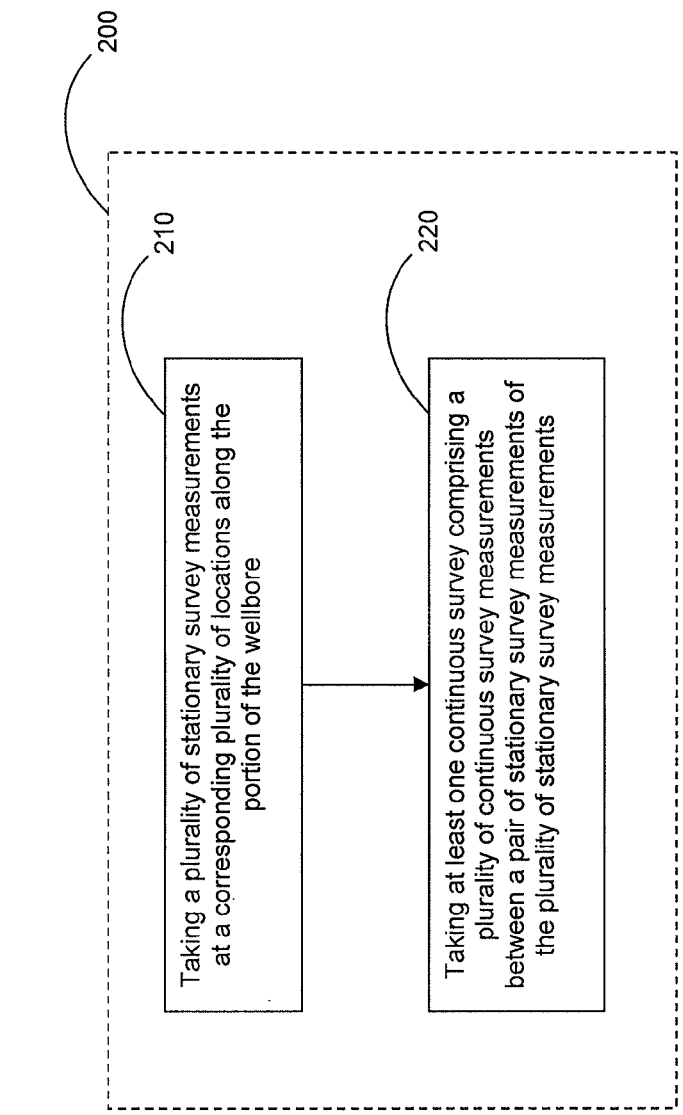
FIG. 2 is a flow diagram of an example method for generating data to be used in producing a continuous wellbore survey of a previously drilled portion of a wellbore in accordance with certain embodiments as described herein.

FIG. 2 is a flow diagram of an example method 200 for generating data for a continuous survey of a previously drilled portion of a wellbore in accordance with certain embodiments as described herein. In an operational block, 210, the method 200 comprises taking a plurality of stationary survey measurements 212 at a corresponding plurality of locations along the portion of the wellbore. In an operational block 220, the method 200 further comprises taking at least one continuous survey 214 comprising a plurality of continuous survey measurements 216 between a pair of stationary survey measurements 212 of the plurality of stationary survey measurements 212.

In certain embodiments, taking the plurality of stationary survey measurements 212 is performed using at least one survey tool (e.g., the at least one survey tool 120 as described herein), and taking the at least one continuous survey 214 is performed using the at least one survey tool. The at least one survey tool can comprise at least one gyroscopic sensor module (e.g., the at least one gyroscopic sensor module 122 as described herein) and at least one accelerometer sensor module (e.g., the at least one accelerometer sensor module 124 as described herein). For example, the at least one gyroscopic sensor module can comprise at least one gyroscopic sensor module that is configured (e.g., dedicated) to performing stationary survey measurements of the Earth's rotation vector (e.g., gyrocompassing survey measurements) and at least one gyroscopic sensor module configured (e.g., dedicated) to performing continuous survey measurements of the Earth's rotation vector (e.g., one or more MEMS gyroscopes). The at least one accelerometer sensor module can comprise at least one accelerometer sensor module that is configured (e.g., dedicated) to measure the Earth's gravitation vector (e.g., as described herein). In certain embodiments, taking the plurality of stationary survey measurements 212 comprises transmitting data from the plurality of stationary survey measurements 212 to a computer system comprising at least one processor (e.g., the at least one processor 130 as described herein), and taking the at least one continuous survey 214 comprises transmitting data from the plurality of continuous survey measurements 216 to the computer system.

In certain embodiments, the at least one survey tool (e.g., the at least one gyroscopic sensor module 122 and the at least one accelerometer sensor module 124) can be moved throughout the wellbore survey operation (e.g., located at sequential positions in an inrun direction downward along the wellbore, located at sequential positions in an outrun direction upward along the wellbore, or both) for performing the stationary survey measurements and the continuous survey measurements. The resulting inrun datasets, the outrun datasets, or both can be transmitted to the computer system and stored by the computer system. In certain embodiments, one or more of the datasets can be transmitted to the computer system while the at least one survey tool is being moved along the wellbore, while in certain other embodiments, one or more of the datasets can be transmitted to the computer system from the at least one survey tool upon retrieval of the at least one survey tool at the Earth's surface, after which the datasets can be processed to produce the combined survey in accordance with certain embodiments described herein.

Figure 3:
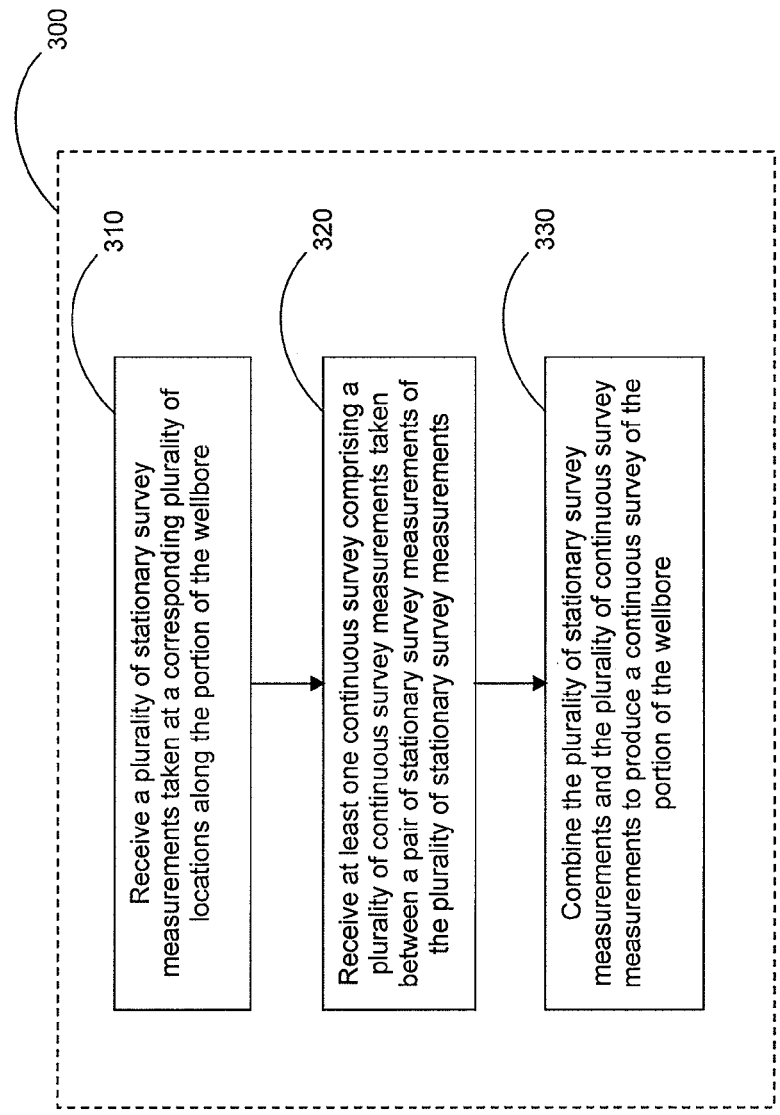
FIG. 3 is a flow diagram of an example method for producing a continuous wellbore survey of a previously drilled portion of a wellbore in accordance with certain embodiments described herein.

FIG. 3 is a flow diagram of an example method 300 for producing a continuous survey of a previously drilled portion of a wellbore in accordance with certain embodiments described herein. In an operational block 310, the method 300 comprises receiving a plurality of stationary survey measurements 212 (e.g., a plurality of gyrocompassing survey measurements) taken at a corresponding plurality of locations along the portion of the wellbore. In an operational block 320, the method 300 further comprises receiving at least one continuous survey 214 comprising a plurality of continuous survey measurements 216 taken between a pair of stationary survey measurements 212 of the plurality of stationary survey measurements 212. In an operational block 330, the method 300 further comprises combining the plurality of stationary survey measurements 212 and the plurality of continuous survey measurements 216 to produce a continuous survey of the portion of the wellbore.

In certain embodiments, receiving the plurality of stationary survey measurements 212 in the operational block 310 comprises taking the plurality of stationary survey measurements 212 (e.g., as in the operational block 210) using the at least one survey tool. In certain embodiments, receiving the at least one continuous survey 214 in the operational block 320 comprises taking the at least one continuous survey 214 (e.g., as in the operational block 220) using the at least one survey tool. In certain embodiments, combining the plurality of stationary survey measurements 212 and the plurality of continuous survey measurements 216 in the operational block 330 comprises using a computer system comprising at least one processor (e.g., the at least one processor 130 described herein), the computer system having received the plurality of stationary survey measurements 212 taken by and transmitted from the at least one survey tool and the plurality of continuous survey measurements 216 taken by and transmitted from the at least one survey tool.

In certain embodiments, the at least one continuous survey 214 comprises continuous survey measurements 216 taken between a pair of sequential stationary survey measurements 212 spaced from one another by a distance along the wellbore in a range of 30 feet to 270 feet (e.g., 90 feet, 180 feet, a length corresponding to one pipe length of the wellbore, a length corresponding to two pipe lengths of the wellbore, a length corresponding to three pipe lengths of the wellbore).

Figure 4A:
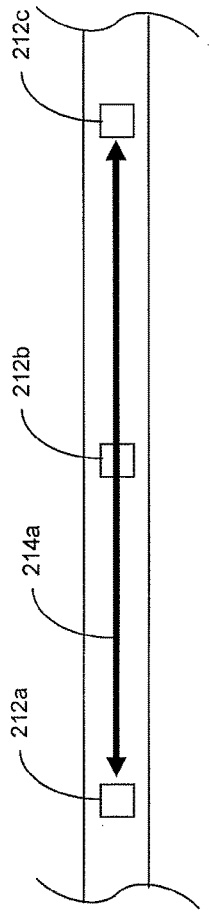
FIGS. 4A-4E schematically illustrate various examples of the stationary survey measurements and the continuous surveys in accordance with certain embodiments described herein.

FIGS. 4A-4E schematically illustrate various examples of the stationary survey measurements 212 and the continuous surveys 214 in accordance with certain embodiments described herein. In certain embodiments, the at least one continuous survey 214 comprising continuous survey measurements 216 taken between the pair of stationary survey measurements 212 spans across (e.g., includes) the location of at least one stationary survey measurement 212 (e.g., there are one or more stationary survey measurements 212 between the pair of stationary survey measurements 212). For example, as schematically shown in FIG. 4A, the continuous survey 214a comprising continuous survey measurements 216 taken between the pair of stationary survey measurements 212a, 212c spans across (e.g., includes) the location of the stationary survey measurement 212b. In certain other embodiments, the at least one continuous survey 214 spans across (e.g., includes) the location of two or more stationary survey measurements 212.

Figure 4B:
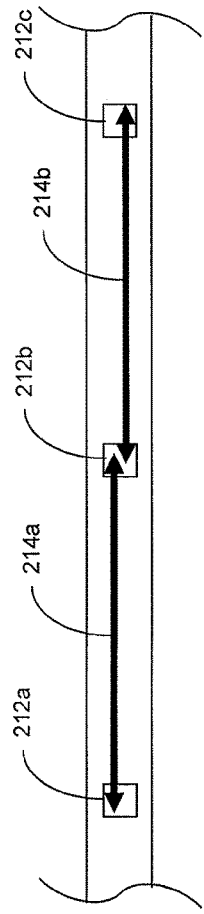

For another example, as schematically shown in FIG. 4B, the continuous survey 214a comprising continuous survey measurements 216 taken between the pair of stationary survey measurements 212a, 212b spans across (e.g., includes) the locations of the stationary survey measurements 212a, 212b, and the continuous survey 214b comprising continuous survey measurements 216 taken between the pair of stationary survey measurements 212a, 212c spans across (e.g., includes) the locations of the stationary survey measurements 212b, 212c. In other words, the continuous survey 214 can include the locations of the pair of stationary survey measurements 212 that at least a portion of the continuous survey 214 is between.

Figure 4C:
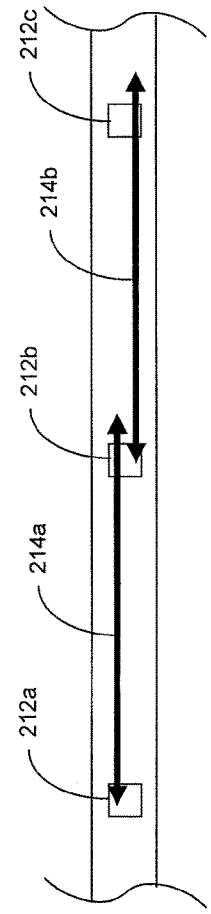

For still another example, as schematically shown in FIG. 4C, the continuous survey 214a comprising continuous survey measurements 216 taken between the pair of stationary survey measurements 212a, 212b spans across (e.g., includes) the location of the stationary survey measurement 212b, the continuous survey 214b comprising continuous survey measurements 216 taken between the pair of stationary survey measurements 212b, 212c spans across (e.g., includes) the location of the stationary survey measurement 212c, and the continuous survey 214a and the continuous survey 214b at least partially overlap one another. At least some of the continuous survey measurements 216 of the continuous survey 214a can also be continuous survey measurements 216 of the continuous survey 214b (e.g., some continuous survey measurements 216 can be included in two or more continuous surveys 214).

Figure 4D:
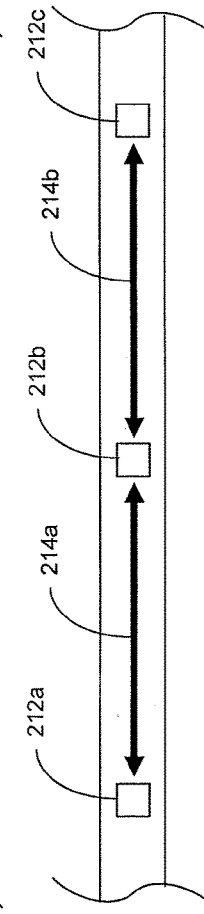

In certain embodiments, the at least one continuous survey 214 comprising continuous survey measurements 216 taken between the pair of stationary survey measurements 212 spans across (e.g., includes) the locations of none of the stationary survey measurements 212 of the plurality of stationary survey measurements 212 (e.g., there are no stationary survey measurements 212 between the pair of stationary survey measurements 212 at either end of the continuous survey 214). For example, as schematically shown in FIG. 4D, the continuous survey 214a comprising continuous survey measurements 216 taken between the pair of stationary survey measurements 212a, 212b does not span across (e.g., include) a location of a stationary survey measurement 212, and the continuous survey 214b comprising continuous survey measurements 216 taken between the pair of stationary survey measurements 212b, 212c does not span across (e.g., include) a location of a stationary survey measurement 212.

Figure 4E:
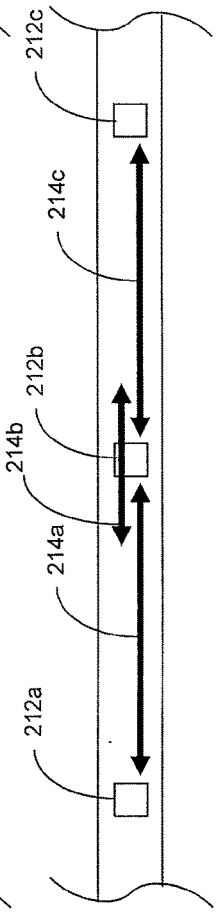

In certain embodiments, various combinations of continuous surveys 214 may be taken. For example, as schematically illustrated in FIG. 4E, the continuous survey 214a is between the pair of stationary survey measurements 212a, 212b without spanning across the locations of other stationary survey measurements 212, the continuous survey 214b is between the pair of stationary survey measurements 212a, 212c and spans across (e.g., includes) the location of the stationary survey measurement 212b, and the continuous survey 214c is between the pair of stationary survey measurements 212b, 212c without spanning across the locations of other stationary survey measurements 212. Other combinations of continuous surveys 214 may also be taken in accordance with certain embodiments described herein.

Figure 5A:
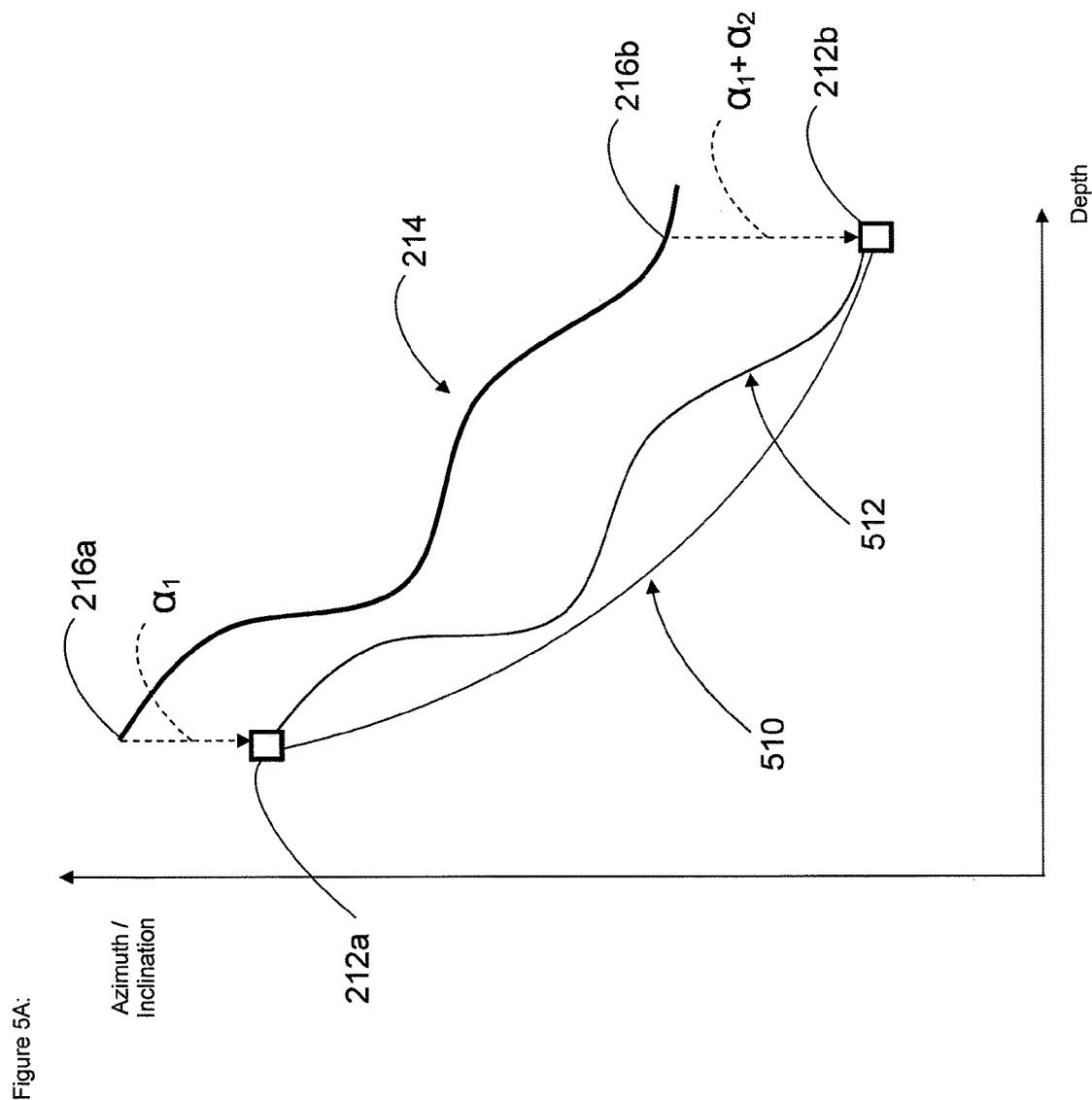
FIG. 5A schematically illustrates an example process for combining the plurality of stationary survey measurements and the plurality of continuous survey measurements to produce a continuous survey of the previously drilled portion of the wellbore in accordance with certain embodiments described herein.
Figure 5B:
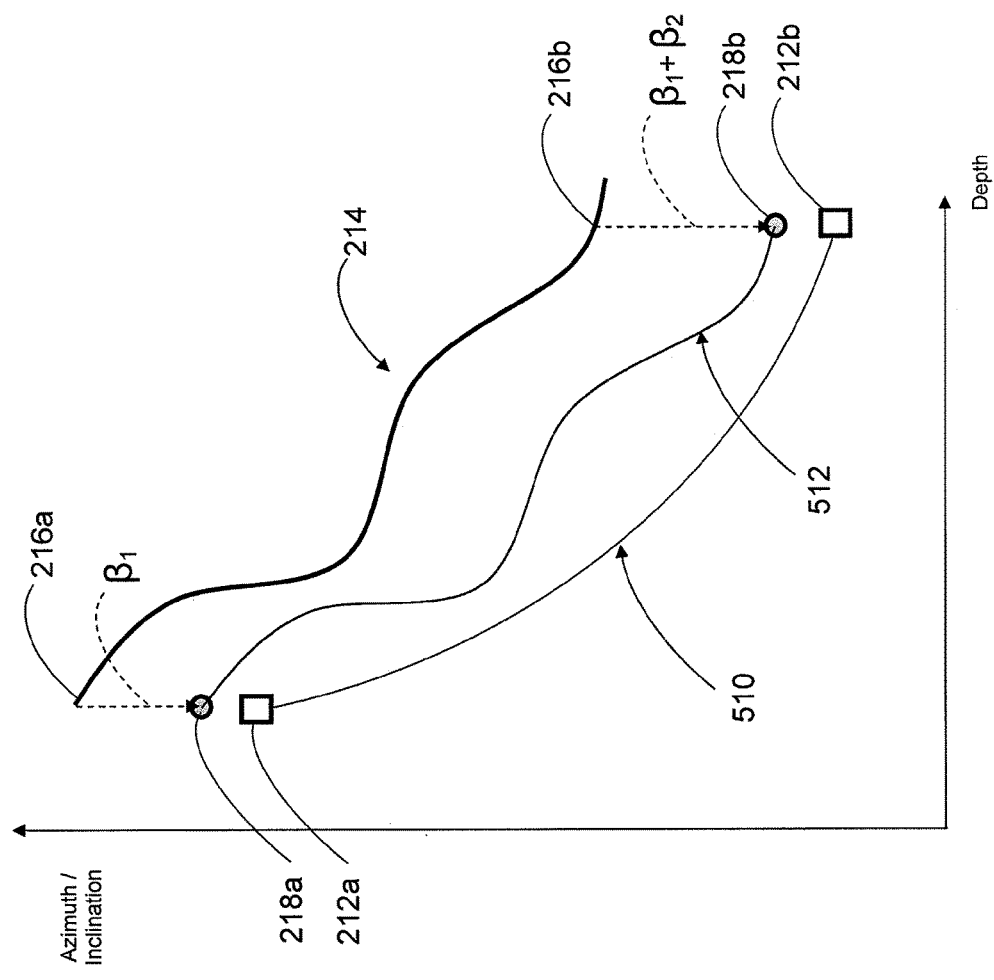
FIG. 5B schematically illustrates another example process for combining the plurality of stationary survey measurements and the plurality of continuous survey measurements to produce a continuous survey of the previously drilled portion of the wellbore in accordance with certain embodiments described herein.

FIGS. 5A and 5B schematically illustrate example processes for combining the plurality of stationary survey measurements 212 and the plurality of continuous survey measurements 216 to produce a continuous survey of the previously drilled portion of the wellbore in accordance with certain embodiments described herein. FIGS. 5A and 5B schematically show a plot of azimuth/inclination versus depth along the wellbore for survey measurements taken during an inrun survey. A pair of stationary survey measurements 212a, 212b (e.g., gyrocompassing survey measurements of azimuth and inclination taken at two different depths along the wellbore) are shown as squares, and a continuous survey 214 comprising a plurality of continuous survey measurements 216 between the stationary survey measurements 212a, 212b is shown as a solid line. The continuous survey 214 spans across (e.g., includes) the location of the stationary survey measurement 212b. A curve fitted to the two stationary survey measurements 212a, 212b by a minimum curvature method is shown by solid line 510, and a combined survey produced by combining the two stationary survey measurements 212a, 212b and the continuous survey measurements 216 of the continuous survey 214 is shown by solid line 512. As can be seen in FIGS. 5A and 5B, the combined survey 512 provides information regarding the tortuosity of the wellbore between the two stationary survey measurements 212a, 212b, while the curve 510 fitted to the two stationary survey measurements 212 contains no such information.

In certain embodiments, the pair of stationary survey measurements 212a, 212b can be used as the start point, the end point, or both for the range of continuous survey measurements 216 to be combined with the stationary survey measurements 212. This process can include adjusting the continuous survey measurements 216, which can comprise reducing (e.g., eliminating) a difference between at least one of the stationary survey measurements 212 of the pair of stationary survey measurements 212 and the continuous survey measurements 216 at the depth of the at least one of the stationary survey measurements 212. Each stationary survey measurement 212 can be used as the start point for the next continuous survey 214, and each segment of the continuous survey 216 can be appropriately adjusted and inserted between the corresponding pair of stationary survey measurements 212 to provide a combined survey. In certain such embodiments, the continuous survey measurements 216 can be adjusted by applying an offset to the continuous survey measurements 216 at depths at or between the stationary survey measurement 212a and the stationary survey measurement 212b. In this way, the continuous survey measurement 216a (e.g., the start point of the continuous survey 214) taken at the depth of the stationary survey measurements 212a can be aligned with the stationary survey measurement 212a. In certain embodiments, rather than having at least some of the adjusted continuous survey measurements 216 be at the same depth as the stationary survey measurements 212, adjusting the continuous survey measurements 216 can comprise reducing (e.g., eliminating) a difference between at least one of the stationary survey measurements 212 of the pair of stationary survey measurements 212 and the continuous survey measurements 216 at a depth within a predetermined distance (e.g., within one foot, within five feet, within ten feet, within 10% of a length of a pipe of the wellbore) from the depth of the at least one of the stationary survey measurements 212.

The continuous survey data can be adjusted accordingly, in one or both of the inclination and azimuth readings. For example, as schematically illustrated in FIG. 5A, the start point 216a of the continuous survey data can be offset (e.g., shifted up or down by applying an offset) by a first amount ($\alpha_1$) such that the start point 216a of the continuous survey data is coincident with one stationary survey measurement 212a. The end point 216b of the continuous survey data can be offset (e.g., shifted up or down by applying an offset) by a second amount ($\alpha_1+\alpha_2$) such that the end point 216b is coincident with the other stationary survey measurement 212b. The individual measurements of the continuous survey data between the start point 216a and the end point 216b can then each be offset (e.g., shifted up or down by applying an offset) by a third amount calculated from an interpolation of the first amount and the second amount that is proportional to the distance of the depth of the individual measurement to the depths of the start point 216a and the end point 216b. For another example, the continuous survey data can be rigidly shifted up or down by a first amount such that the start point 216a is coincident with the one stationary survey measurement 212a, and the remaining measurements of the continuous survey data can then be rigidly rotated about the one stationary survey measurement 212a (e.g., rotated about the start point 216a in FIG. 5A such that the continuous survey data maintains its shape) until the end point 216b of the continuous survey data coincides with or is within a predetermined amount from the other stationary survey measurement 212b.

In certain embodiments, the stationary survey measurements 212 and the continuous survey measurements 216 collected over each wellbore section between successive stationary survey depths may be combined together by first computing a weighted average 218a of the start points 212a, 216a and a weighted average 218b of the end points 212b, 216b for the stationary survey measurements 212 and the continuous survey measurements 216 (e.g., for both inclination and azimuth). The weighting factors used can be based on representative error models for the two survey tools used to make these measurements. In configurations in which the stationary survey data is collected using a significantly higher performance gyro system than that used for collecting the continuous survey data, the weighted averages 218a, 218b of the start and end points can coincide closely with the start and end points 212a, 212b of the stationary survey measurements 212.

Once new start and end points 218a, 218b are defined for the wellbore section under consideration, the continuous survey data can be adjusted accordingly, in one or both of the inclination and azimuth readings. For example, as schematically illustrated in FIG. 5B, the start point 216a of the continuous survey data can be offset (e.g., shifted up or down by applying an offset) by a first amount ($\beta_1$) such that the start point 216a of the continuous survey data is coincident with the weighted average start point 218a. The end point 216b of the continuous survey data can be offset (e.g., shifted up or down by applying an offset) by a second amount ($\beta_1+\beta_2$) such that the end point 216b is coincident with the weighted average end point 218b. The individual measurements of the continuous survey data between the start point 216a and the end point 216b can then be offset (e.g., shifted up or down by applying an offset) by a third amount calculated from an interpolation of the first amount and the second amount that is proportional to the distance of the depth of the individual measurement to the depths of the start point 216a and the end point 216b. For another example, the continuous survey data can be rigidly shifted up or down by a first amount such that the start point 216a is coincident with the weighted average start point 218a, and the remaining measurements of the continuous survey data can then be rigidly rotated about the weighted average start point 218a (e.g., rotated about the weighted average start point 218a in FIG. 5B such that the continuous survey data maintains its shape) until the end point 216b of the continuous survey data coincides with or is within a predetermined amount from the weighted average end point 218b.

In certain embodiments, the at least one gyroscopic sensor module 122b dedicated to continuous survey measurements can include lower-grade gyroscopic sensors that are significantly susceptible to bias errors (e.g., errors in azimuth, inclination, or both). At locations in which the at least one survey tool 120 has stopped to conduct one or more stationary survey measurements 212 (e.g., at the location of stationary survey measurement 212a of FIGS. 5A and 5B), a comparison can be made (e.g., by the at least one processor 130 of the computer system) between the angular rates measured by the at least one gyroscopic sensor module 122a dedicated to stationary survey measurements and the at least one gyroscopic sensor module 122b dedicated to continuous survey measurements. Differences between the respective x-, y-, and z-axis measurements of these gyroscopic sensor modules 122a, 122b can be assumed to arise as a result of bias errors in the lower-grade sensors of the at least one gyroscopic sensor module 122b dedicated to continuous survey measurements. Based on this assumption; the measurement differences can be interpreted as errors in the lower-grade sensors and corrections can be applied accordingly (e.g., by applying an offset to the continuous survey 214, as shown in FIGS. 5A and 5B).

Figure 6:
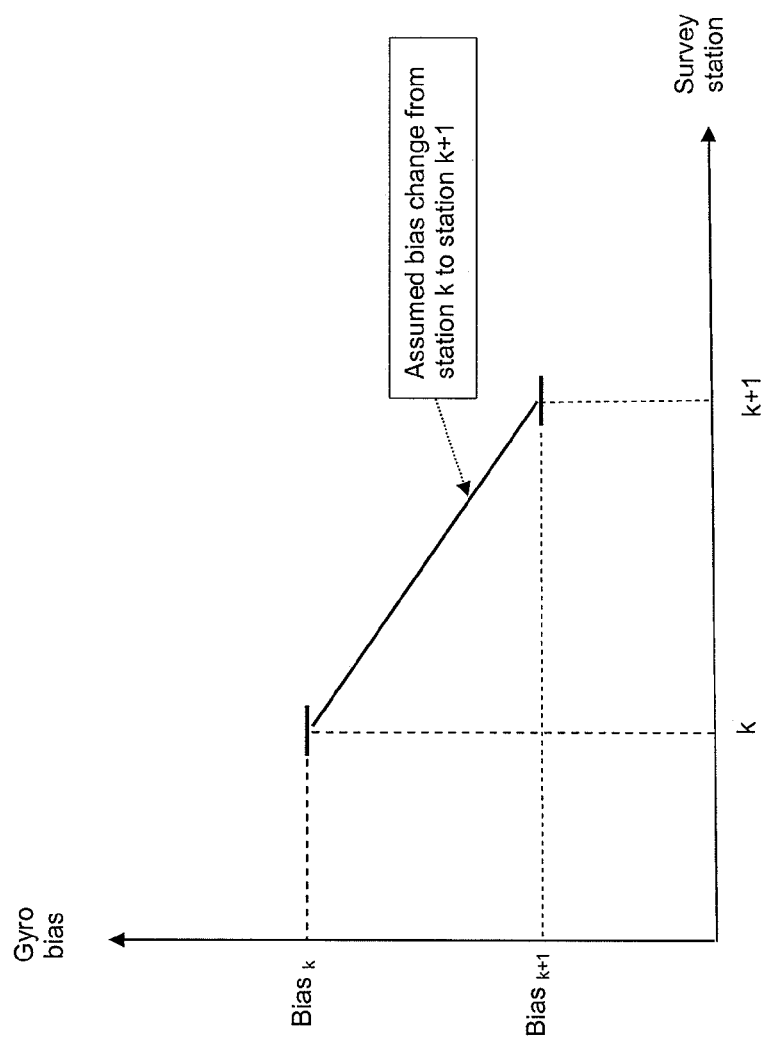
FIG. 6 schematically illustrates an example process for correcting the continuous survey for bias errors in accordance with certain embodiments described herein.

In certain embodiments, the process of correcting the continuous survey 214 can be extended to account for changes in the bias errors of the lower-grade sensors of the at least one gyroscopic sensor module 122b dedicated to continuous survey measurements. FIG. 6 schematically illustrates an example process for correcting the continuous survey 214 for bias errors in accordance with certain embodiments described herein. For example, the bias error can be assumed to have changed between a starting point of a continuous survey 214 and an ending point of the continuous survey 214 by a predetermined relationship (e.g., a linear change). The continuous survey measurements 216 taken at adjacent survey stations (e.g., adjacent locations of the stationary survey measurements 212 which can be considered to be the location of survey station k and the location of survey station k+1) can be compared to these stationary survey measurements 212 to determine the bias errors (e.g., bias errors in azimuth, inclination, or both) of the continuous survey measurements 216 at these adjacent survey station locations (e.g., bias errors $bias_k$ and $bias_{k+1}$). The bias errors for the continuous survey measurements 216 at the locations between these two survey station locations can be assumed to have changed by a predetermined relationship (e.g., linear). The interpolated bias errors can be calculated using this predetermined relationship at locations between the pair of stationary survey measurements 212 (e.g., between the locations of survey station k and survey station k+1). The bias errors for the continuous survey measurements 216 at the locations between the two survey station locations can be corrected by applying offsets to correct for the interpolated bias errors. Such corrections can be made for each continuous survey 214 taken along the wellbore.

In certain embodiments, additional adjustments can be made to the continuous survey 214 to combine it with the pair of stationary survey measurements 212 in a self-consistent manner.

Gyrocompassing Surveys using Drop Survey Tool

As also noted above, gyrocompassing (i.e., stationary) surveys and continuous surveys may be used to determine the true path or trajectory of a wellbore. In various implementations further described below, a drop survey tool disposed in a previously drilled wellbore may be used to acquire continuous survey data during an inrun data acquisition and to acquire gyrocompassing (i.e., stationary) survey data during an outrun data acquisition. In particular, as further described below, the drop survey tool may record the continuous survey data as it descends within a drill string, and the drop survey tool may record the gyrocompassing (i.e., stationary) data as the drill string is retrieved from the wellbore. The continuous survey data and the gyrocompassing (i.e., stationary) survey data may be combined and used to generate a continuous survey of the wellbore, which may be used to determine the true path or trajectory of the wellbore.

System

Figure 7:
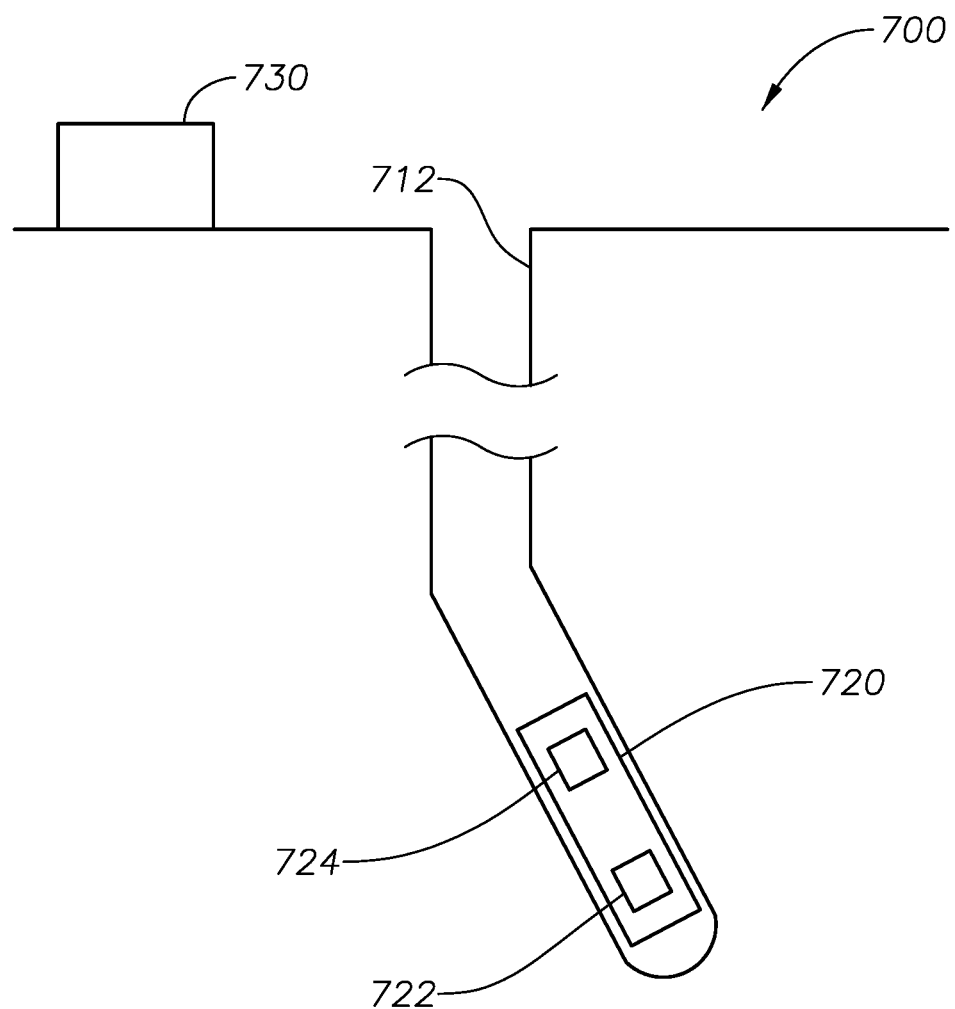
FIG. 7 illustrates a schematic diagram of a gyrocompassing survey operation in accordance with implementations of various techniques described herein.

FIG. 7 illustrates a schematic diagram of a gyrocompassing survey operation 700 in accordance with implementations of various techniques described herein. As shown, the gyrocompassing survey operation may be performed using a drop survey tool 720 and a computing system 730.

The drop survey tool 720 may be similar to the survey tool discussed above. The drop survey tool 720 may be disposed within a wellbore 712, and may be used in conjunction with various applications, as discussed below. The drop survey tool 720 may also include one or more gyroscopic sensors 722 and one or more accelerometers 724. As is known in the art, the drop survey tool 720 may be uncoupled from the surface, and may be powered using one or more batteries. Any drop survey tool 720 known to those skilled in the art and configured to carry out the implementations described below may be used.

The drop survey tool 720 may be configured to perform both inrun and outrun data acquisitions, as further described below. In particular, the drop survey tool 720 may acquire continuous survey data during the inrun data acquisition, and may acquire gyrocompassing (i.e., stationary) survey data during the outrun data acquisition.

During the inrun data acquisition, the drop survey tool 720 may be dropped into a drill string (not pictured) of the wellbore 712, record the continuous survey data as it falls within the drill string, and store that data in an electronic memory device (not pictured) in the survey tool 720. The drop survey tool 720 may be configured to land at the bottom of the drill string, such as in an area proximate to a bottom hole assembly of the drill string. In one implementation, the drop survey tool 720 may include a spring mounted to the bottom of the tool and/or any other implementation known in the art that may be used to minimize levels of shock and vibration for the tool 720 as it travels down the wellbore and lands within the drill string.

The continuous survey data recorded as the drop survey tool 720 falls in the drill string may correspond to continuous survey measurements acquired using the one or more gyroscopic sensors 722, the one or more accelerometers 724, and/or any other sensors of the survey tool 720. In particular, the continuous survey data may include measured changes in inclination and azimuth at frequent intervals along the wellbore as the tool 720 falls within the drill string. In one implementation, such intervals may be no greater than every 1 foot along the wellbore. The data sampling frequency of the survey tool 720 may depend on the rate of descent of the tool 720 within the drill string. The faster that the tool 720 moves within the drill string, the higher that the data sampling frequency should be to take account of the trajectory of the wellbore. For example, if, as mentioned above, the tool 720 is to measure changes in inclination and azimuth for every one foot in the wellbore, then the survey tool 720 descending at 200 feet per minute will need a data sampling frequency that is greater than three samples per second.

In some implementations, the drop survey tool 720 may freefall in the drill string after it is initially dropped. However, various implementations for the drop survey tool 720 may be used in order to control a rate of descent within the drill string, and to minimize levels of shock and vibration for the tool 720 as it travels down the wellbore and lands within the drill string. For example, U.S. Pat. No. 6,209,391, which is incorporated by reference in its entirety, discloses a blended buoyancy oil well survey instrument that, in some implementations, is configured to control the buoyant descent of the instrument to about 100 or 200 feet per minute. In another implementation, the drop survey tool 720 may include various mechanical components that may engage with the inner diameter of the drill string, thus slowing the rate of descent of the drop survey tool 720.

In addition, the rate of descent of the drop survey tool 720 may be controlled based on the drilling fluid being pumped in the wellbore. In particular, the drill string may be filled with the drilling fluid, where the fluid may be resistant to the free falling of the drop survey tool 720. As such, the rate at which the drilling fluid is pumped in the wellbore may be used to control the speed of the tool 720. In addition, the rate at which the drilling fluid is pumped in the wellbore may be used to control the speed of the tool 720 for any high-angle sections of the wellbore 712. In one implementation, the rate of descent of the tool 720 may be limited to as low as 1-2 feet per minute. In another implementation, the viscosity of the drilling fluid may be changed to alter the rate of descent of the tool 720.

In addition, the continuous survey data also includes depth data acquired by the drop survey tool 720 during the inrun data acquisition. For example, in one implementation, the drop survey tool 720 may include a casing collar locator (not shown). As is known in the art, a casing collar locator may be used to find or locate collars or casing joint ends of the segments that form the casing of the wellbore 712. Given that casing joints may have known spacing, the depth of the survey tool 720 within the wellbore can be determined if the casing collars or joints can be correctly counted. As such, the casing collar locator can be used to estimate the depth of the survey tool 720 (i.e., the depth data) at the survey points for the continuous survey data recorded during the inrun data acquisition. In one implementation, the casing collar locator may include one or more magnetic sensors.

In another implementation, the depth of the survey tool 720 (i.e., the depth data) at the survey points for the continuous survey data recorded during the inrun data acquisition can also be determined using the one or more accelerometers 724. In particular, the one or more accelerometers 724 may include a z-axis accelerometer configured to provide measurements of the acceleration along a longitudinal axis (i.e., z-axis) of the survey tool. As such, the z-axis accelerometer may be used to determine the depth of the survey tool 720 at the survey points for the continuous survey data recorded during the inrun data acquisition, particularly if the rate of descent for the tool 720 is substantially constant. In particular, the measurements acquired using the z-axis accelerometer may be integrated twice in order to determine the depth of the survey tool 720 at the survey points. In a further implementation, the depth of the survey tool 720 (i.e., the depth data) at the survey points for the continuous survey data can be determined using both a casing collar locator and the z-axis accelerometer. In particular, the casing collar locator may be used to estimate the depth of collars or casing joint ends of the segments that form the casing of the wellbore 712, while the z-axis accelerometer may be used to determine the depth of the survey tool 720 at points between the joint ends. In yet another implementation, empirical velocity profiles may also be used to determine the depth of the survey tool 720 at the survey points for the continuous survey data recorded during the inrun data acquisition.

As noted above, the drop survey tool 720 may acquire gyrocompassing (i.e., stationary) survey data during the outrun data acquisition. The drop survey tool 720 may perform the outrun data acquisition as the tool 720 is extracted from the wellbore 712. In particular, after being dropped in the drill string and performing the inrun data acquisition, the drop survey tool 720 may land at the bottom of the drill string, such as in an area proximate to a bottom hole assembly of the drill string.

After a period of time, the drill string may be retrieved, such as for the inspection or replacement of a drill bit coupled to the bottom of the drill string. In particular, as is known in the art, the drill string may be composed of multiple sections threadably coupled together. As such, during retrieval, one section of the drill string is pulled out of the wellbore (i.e., recovered), and movement of the drill string is momentarily stabilized. The recovered section of the drill string is then unthreaded from the drill string, and the same retrieval process is repeated for subsequent sections of the drill string. Thus, during the retrieval of the drill string, the drop survey tool 720 positioned at the bottom of the drill string is slowly raised within the wellbore and placed in multiple stationary positions of different depths with respect to the Earth (i.e., each time a section of the drill pipe is unthreaded).

Accordingly, the drop survey tool 720 may be configured to acquire stationary survey data as the drill string is being retrieved from the wellbore, during which the tool 720 records the stationary survey data at the multiple stationary positions within the wellbore and stores that data in the electronic memory device in the survey tool 720. In particular, the data recorded by the tool 720 at the multiple stationary positions may correspond to stationary survey measurements acquired using the one or more gyroscopic sensors 722, the one or more accelerometers 724, and/or any other sensors of the survey tool 720.

In addition, the stationary survey data also includes depth data acquired by the drop survey tool 720 during the outrun data acquisition. In one implementation, the depth of the survey tool 720 (i.e., the depth data) at the survey points for the stationary survey data recorded during the outrun data acquisition can be determined based on the known lengths of the drill string and of each section of the drill string that is pulled out during the retrieval process. For example, if each section of the drill string is 90 feet long, then the tool 720 may record data at multiple positions along the wellbore 712 that are spaced at 90 feet from each other. In another implementation, systems known to those skilled in the art may be used to track the depth of a drill bit coupled to the drill string. As such, the depth of the survey tool 720 at the survey points can be determined based on the known depths of the drill bit, such as by applying an offset to the known depths of the drill bit during the gyrocompassing survey.

In a further implementation, the drop survey tool 720 may include a computing system (not shown), which may switch the drop survey tool 720 between a continuous survey mode, during which the continuous survey data can be acquired, and a stationary survey mode (or gyrocompassing survey mode), during which the stationary survey data can be acquired. In one such implementation, the tool 720 may switch from the continuous survey mode to the stationary survey mode after a predetermined period of time. In particular, the tool 720 may initially be set to the continuous survey mode, which allows for the acquisition of continuous survey measurements using the one or more gyroscopic sensors 722, the one or more accelerometers 724, and/or any other sensors of the survey tool 720. After the predetermined period of time from the start of the inrun data acquisition, during which the tool 720 is dropped and records the continuous survey data corresponding to the continuous survey measurements, the tool 720 may be switched to the stationary survey mode. After being set to the stationary survey mode, the tool 720 may be configured to acquire stationary survey measurements using the one or more gyroscopic sensors 722, the one or more accelerometers 724, and/or any other sensors of the survey tool 720.

In another such implementation, the tool 720 may automatically switch from the continuous survey mode to the stationary survey mode based on the motion detected by the one or more gyroscopic sensors 722 and the one or more accelerometers 724. As explained above, the tool 720 comes to a rest in an area proximate to a bottom hole assembly of the drill string after the inrun data acquisition. When the tool 720 comes to a rest, the measurements from the one or more gyroscopic sensors 722 and the one or more accelerometers 724 may stabilize, measuring only components of the Earth's rotation rate and the local gravity vector, respectively. As such, the computing system of the tool 720 may compare the standard deviations of the measurements, monitored over a fixed period of time, against predefined tolerance levels in order to determine when the tool 720 has come to a rest in the area proximate to the bottom hole assembly of the drill string. If the computing system determines that the tool has come to a rest, then the tool 720 may switch to the stationary survey mode.

The one or more gyroscopic sensors 722 of the tool 720 can be any gyroscopic sensor known to those skilled in the art, including those described above with respect to the gyroscopic sensor modules of FIGS. 1A and 1B. In one implementation, as is known to those skilled in the art, the one or more gyroscopic sensors 722 may include three single-axis gyroscopic sensors or two dual-axis gyroscopic sensors, and may be used to provide measurements of the Earth's rotation rate with respect to the x, y, and z axes of the survey tool 720.

In some implementations, the same gyroscopic sensors 722 may be used for acquiring either the continuous survey data or the stationary survey data. In other implementations, different gyroscopic sensors 722 may be dedicated to acquiring either the continuous survey data or the stationary survey data.

The one or more accelerometers 724 may include three single-axis accelerometers configured to provide measurements of the orthogonal components ($g_x$, $g_y$, $g_z$) of the Earth's gravitation vector with respect to the x, y, and z axes of the survey tool 720. Various types of accelerometers may be used, including those described above with respect to the accelerator modules of FIGS. 1A and 1B.

The drop survey tool 720 may also include any other sensors and/or instrumentation known to those skilled in the art, such as the magnetic sensors used with respect to the casing collar locator described above.

The computing system 730 may be used to process the data recorded by the survey tool 720 during both the inrun and the outrun data acquisitions, as further described in a later section. In particular, based on the recorded data, the computing system 730 may be used to generate a continuous survey of the wellbore.

In one implementation, the computing system 730 may be located at the surface, and may be configured to receive or download the recorded data from the tool 720 after the tool 720 has been retrieved from the wellbore 712. The computing system 730 can be any computing system implementation known to those skilled in the art, including the processors described above with respect to FIGS. 1A and 1B. Various implementations of the computing system 730 are also discussed further below in another section.

Method

Figure 8:
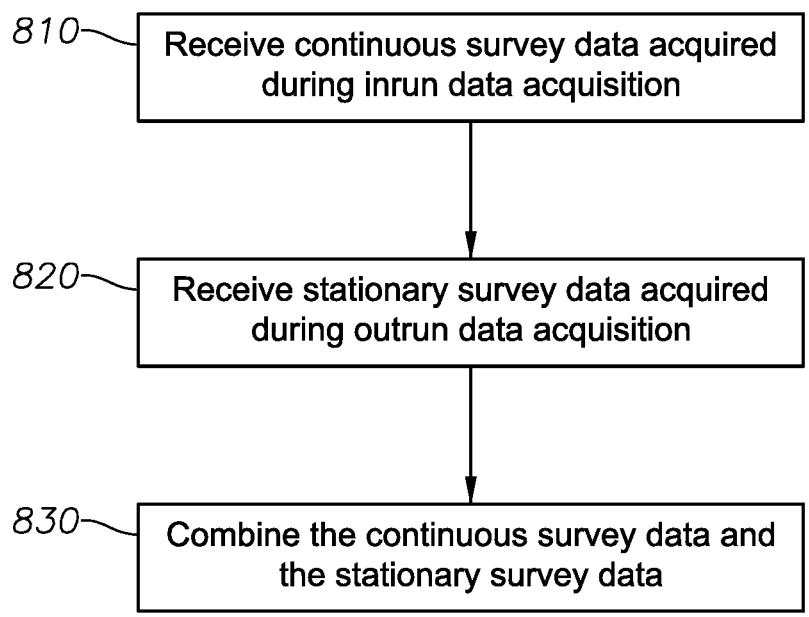
FIG. 8 illustrates a flow diagram of a method for generating a continuous or near continuous survey of a wellbore in accordance with implementations of various techniques described herein.

FIG. 8 illustrates a flow diagram of a method 800 for generating a continuous survey of a wellbore in accordance with implementations of various techniques described herein. In one implementation, method 800 may be at least partially performed by a computing system, such as the computing system 730 discussed above. It should be understood that while method 800 indicates a particular order of execution of operations, in some implementations, certain portions of the operations might be executed in a different order. Further, in some implementations, additional operations or steps may be added to the method 300. Likewise, some operations or steps may be omitted.

At block 810, the computing system may receive continuous survey data acquired during an inrun data acquisition using a drop survey tool, where the drop survey tool is configured to acquire the continuous survey data as the tool descends within a wellbore during the inrun data acquisition. In particular, the continuous survey data may be data corresponding to a plurality of continuous survey measurements acquired during the inrun data acquisition.

As noted above, the drop survey tool may be dropped into a drill string of the wellbore, record data as it falls within the drill string, and store that data in an electronic memory device in the survey tool. Additionally, various implementations for the drop survey tool may be used in order to control a rate of descent within the drill string, and to minimize levels of shock and vibration for the tool as it travels and lands within the drill string. Further, as explained above, the rate of descent of the drop survey tool may be controlled based on the drilling fluid being pumped in the wellbore.

As also noted above, the continuous survey data may include measured changes in inclination and azimuth at frequent intervals along the wellbore as the tool falls within the drill string. In one implementation, such intervals may be no greater than every 1 foot along the wellbore.

The continuous survey data may be acquired using one or more gyroscopic sensors, one or more accelerometers, and/or any other sensors of the survey tool. The continuous survey data can also include depth data acquired during the inrun data acquisition, where the depth data corresponds to the depth of the survey tool at the survey points for the continuous survey data. The depth data can be determined using a casing collar locator, a z-axis accelerometer, and/or the like.

At block 820, the computing system may receive stationary survey data acquired during an outrun data acquisition using the drop survey tool, where the drop survey tool is configured to acquire the stationary survey data as the tool ascends within the wellbore during the outrun data acquisition. In particular, the stationary survey data may be data corresponding to a plurality of stationary survey measurements acquired during the outrun data acquisition.

As noted above, the drop survey tool may be configured to perform the outrun data acquisition as the drill string is being retrieved from the wellbore, during which the tool records stationary survey data at multiple stationary positions within the wellbore and stores that data in the electronic memory device in the survey tool.

The stationary survey data may be acquired using one or more gyroscopic sensors, one or more accelerometers, and/or any other sensors of the survey tool. The stationary survey data can also include depth data acquired during the outrun data acquisition, where the depth data corresponds to depth of the survey tool at the survey points for the stationary survey data. The depth data can be determined based on the known lengths of the drill string and of each section of the drill string that is pulled out during the retrieval process.

At block 830, the computing system may combine the continuous survey data and the stationary survey data. Various methods known to those skilled in the art may be used for combining the continuous survey data and the stationary survey data. In one implementation, the continuous survey data and the stationary survey data may be combined in similar manner as described above with respect to FIGS. 5A and 5B.

Figure 9:
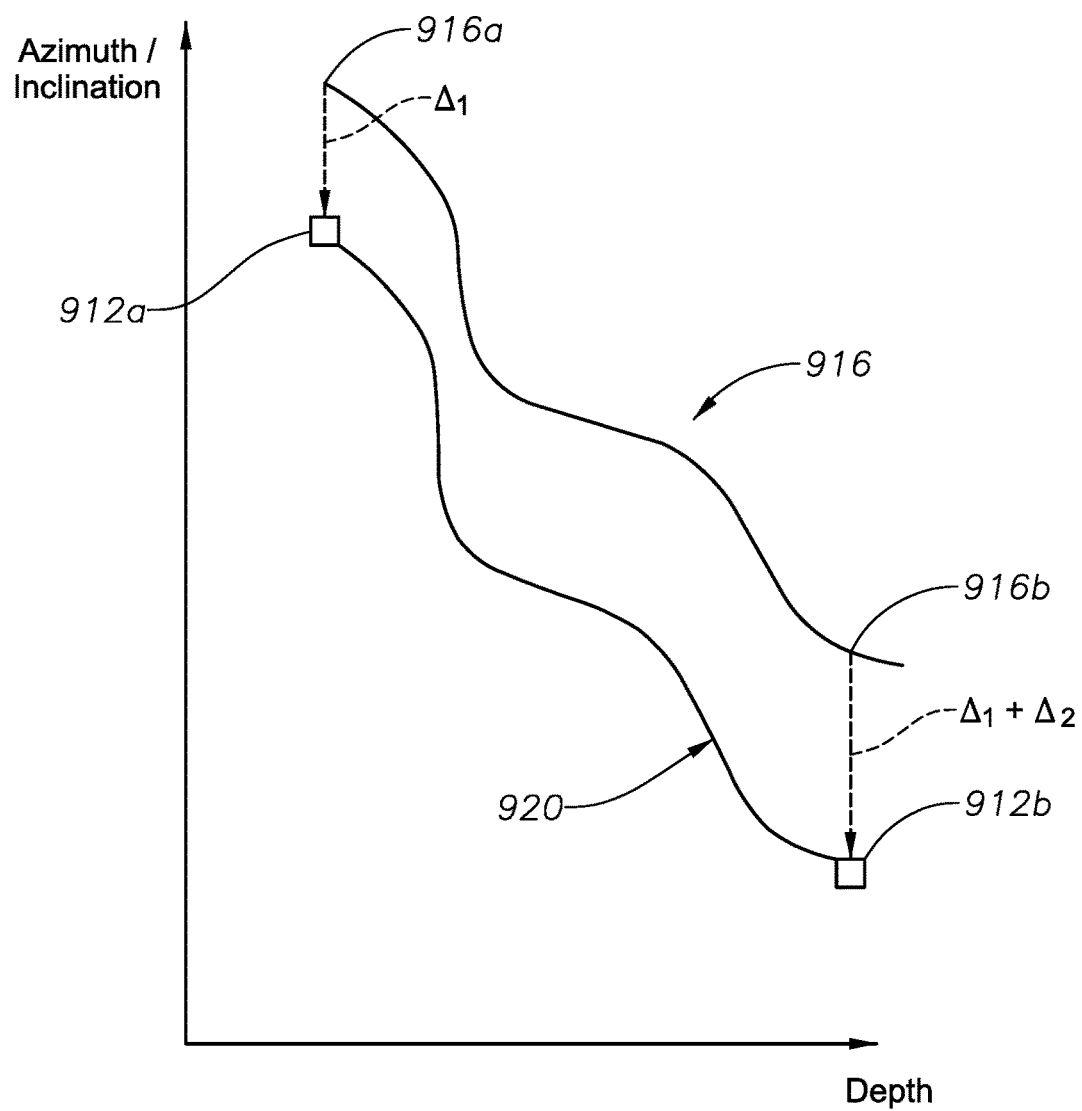
FIG. 9 illustrates a process for combining the continuous survey data and the stationary survey data in accordance with implementations of various techniques described herein.

FIG. 9 illustrates a process for combining the continuous survey data and the stationary survey data in accordance with implementations of various techniques described herein. In particular, FIG. 9 illustrates a plot of azimuth/inclination versus depth along the wellbore for continuous survey measurement data acquired during an inrun data acquisition and for stationary survey measurement data acquired during an outrun data acquisition.

A pair of stationary survey measurements 912a, 912b acquired during an outrun data acquisition (e.g., gyrocompassing survey measurements of azimuth and inclination taken at two different depths along the wellbore) are shown as squares. In addition, a plurality of continuous survey measurements 916 acquired during an inrun data acquisition at depths between the stationary survey measurements 912a, 912b is shown as a solid line.

In some implementations, the pair of stationary survey measurements 912a, 912b can be used as the start point, the end point, or both for the range of continuous survey measurements 916 to be combined with the stationary survey measurements 912. This process can include adjusting the continuous survey measurements 916, which can comprise reducing (e.g., eliminating) a difference between at least one of the stationary survey measurements 912 and the continuous survey measurements 916 at the depth of the at least one of the stationary survey measurements 912. Each stationary survey measurement 912 can be used as the start point for the next continuous survey measurement 916, and each segment of the continuous survey measurements 916 can be appropriately adjusted and inserted between the corresponding pair of stationary survey measurements 912 to provide a combined survey.

In some implementations, the continuous survey measurements 916 can be adjusted by applying an offset to the continuous survey measurements 916 at depths at or between the stationary survey measurement 912a and the stationary survey measurement 912b. In particular, the continuous survey measurement 916a (e.g., the start point of the continuous survey measurement 916) taken at the same depth of the stationary survey measurements 912a can be aligned with the stationary survey measurement 912a.

In one implementation, rather than having at least some of the adjusted continuous survey measurements 916 be at the same depth as the stationary survey measurements 912, adjusting the continuous survey measurements 916 can comprise reducing (e.g., eliminating) a difference between at least one of the stationary survey measurements 912 of the pair of stationary survey measurements 912 and the continuous survey measurements 916 at a depth within a predetermined distance (e.g., within one foot, within five feet, within ten feet, within 10% of a length of a pipe of the wellbore) from the depth of the at least one of the stationary survey measurements 912. The continuous survey data acquired during the inrun data acquisition can be adjusted accordingly in the inclination and azimuth readings. For example, as schematically illustrated in FIG. 9, the start point 916a of the continuous survey data acquired during the inrun data acquisition can be offset (e.g., shifted up or down by applying an offset) by a first amount ($\Delta_1$) such that the start point 916a of the continuous survey data is coincident with one stationary survey measurement 912a. The end point 916b of the continuous survey data acquired during the inrun data acquisition can be offset (e.g., shifted up or down by applying an offset) by a second amount ($\Delta_1+\Delta_2$) such that the end point 916b is coincident with the other stationary survey measurement 912b.

The individual measurements of the continuous survey data between the start point 916a and the end point 916b can then each be offset (e.g., shifted up or down by applying an offset) by a third amount calculated from an interpolation of the first amount and the second amount, where the third amount is proportional to the distance of the depth of the individual measurement to the depths of the start point 916a and the end point 916b.

For another example, the continuous survey data acquired during the inrun data acquisition can be rigidly shifted up or down by a first amount such that the start point 916a is coincident with the one stationary survey measurement 912a, and the remaining measurements of the continuous survey data can then be rigidly rotated about the one stationary survey measurement 912a (e.g., rotated about the start point 216a in FIG. 9, such that the continuous survey data maintains its shape) until the end point 916b of the continuous survey data coincides with or is within a predetermined amount from the other stationary survey measurement 912b.

The combined continuous survey produced by combining the two stationary survey measurements 912a, 912b and the continuous survey measurements 916 is shown by solid line 920. As can be seen in FIG. 9, the combined continuous survey 920 provides information regarding the trajectory, and thus tortuosity, of the wellbore between the two stationary survey measurements 912a, 912b. The process discussed above can be repeated to combine the remaining continuous survey data and stationary survey data in order to produce a combined continuous survey of the wellbore. In particular, the combined continuous survey of the wellbore may provide information regarding the trajectory of the wellbore for discrete intervals along the wellbore, where the discrete intervals may be determined based on the data sampling frequency of the drop survey tool.

In particular, as noted above, it can be desirable to use a continuous survey of a wellbore to more accurately determine the true path or trajectory of a previously drilled wellbore. An accurate determination of the trajectory of a wellbore can be used in the identification of low-tortuosity sections for permanent installation of completion or production equipment, and the identification of high-tortuosity sections in which rod guide wear sleeve equipment is to be placed to increase rod and casing life and to reduce workover frequency. Furthermore, detailed knowledge of well tortuosity may help the evaluation of the drilling equipment and process, in particular the steering while drilling performance, and for extended reach drilling.

For example, the tortuosity information can be helpful in determining where to place one or more pumps in the wellbore. The placement of a pump in a wellbore section having a relatively high tortuosity can reduce the lifetime of the pump dramatically. If installed in a higher-tortuosity section of the wellbore, the pump may be subject to a bending moment due to the shape of the wellbore restricting the ability of the pump rotor to turn freely (e.g., as a result of excess pressure on the bearings or sliding contact between the rotor and the outer casing of the pump), causing the pump to wear out sooner than had the pump been installed in a lower-tortuosity section of the wellbore.

The implementations described above with respect to FIGS. 1-9 may also be used in conjunction with other methods for analyzing the tortuous sections of a wellbore, such as the implementations described in commonly-assigned U.S. patent application Ser. Nos. 14/612,162 and 14/612,168, both of which are herein incorporated by reference.

In another implementation, drift corrections of the drop survey tool may be performed during the inrun data acquisition as the tool descends within the wellbore. Continuous surveys may be subject to measurement drifts, which can propagate and increase in size over long wellbore sections and lead to inaccuracies in inclination and azimuth. As noted above, the rate at which the drilling fluid is pumped in the wellbore may be used to control the speed of the survey tool. Thus, the rate of the drilling fluid may be set such that the survey tool is relatively stationary at a point during the inrun data acquisition. During this point, bias errors relating to drift can be determined for the one or more gyroscopic sensors and/or the one or more accelerometers of the survey tool.

In sum, implementations relating to generating a continuous survey of a wellbore may be used to more accurately determine the true path or trajectory of a previously drilled wellbore. This may be particularly important for wellbores containing severe high dog-legs and sections of high tortuosity, where failure to capture such details of trajectory can lead to errors in knowledge of well locations. As noted above, an accurate determination of the trajectory of a wellbore can be used in the identification of low-tortuosity sections for permanent installation of completion or production equipment, and the identification of high-tortuosity sections in which rod guide wear sleeve equipment is to be placed to increase rod and casing life and to reduce workover frequency.

Computing System

Various implementations of computing systems are further discussed below, including computing system 730 of FIG. 7. Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, smart watches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 10:
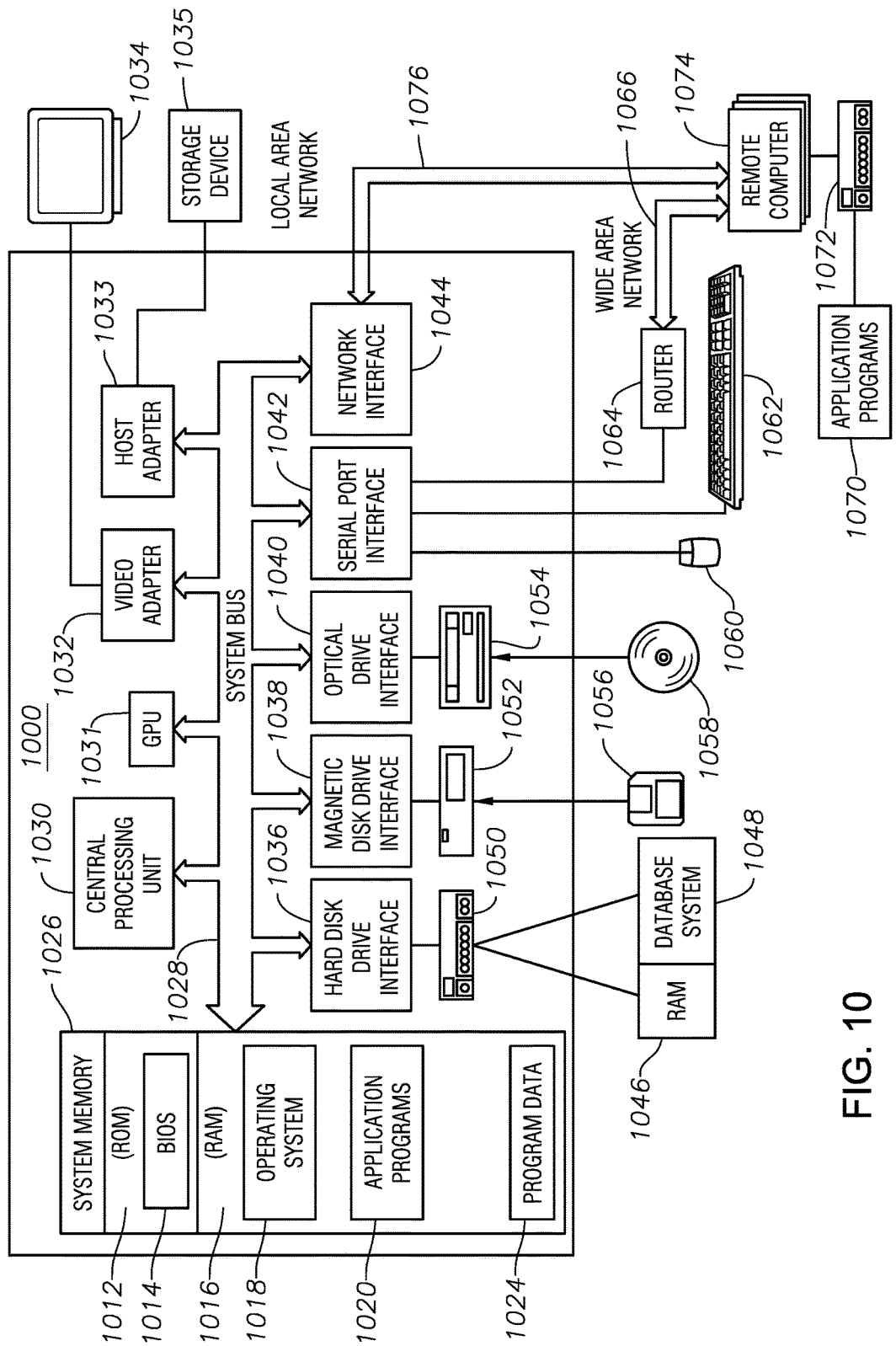
FIG. 10 illustrates a schematic diagram of a computing system in which the various technologies described herein may be incorporated and practiced.

FIG. 10 illustrates a schematic diagram of a computing system 1000 in which the various technologies described herein may be incorporated and practiced. Although the computing system 1000 may be a conventional desktop or a server computer, as described above, other computer system configurations may be used.

The computing system 1000 may include a central processing unit (CPU) 1030, a system memory 1026, a graphics processing unit (GPU) 1031 and a system bus 1028 that couples various system components including the system memory 1026 to the CPU 1030. Although one CPU is illustrated in FIG. 10, it should be understood that in some implementations the computing system 1000 may include more than one CPU. The GPU 1031 may be a microprocessor specifically designed to manipulate and implement computer graphics. The CPU 1030 may offload work to the GPU 1031. The GPU 1031 may have its own graphics memory, and/or may have access to a portion of the system memory 1026. As with the CPU 1030, the GPU 1031 may include one or more processing units, and the processing units may include one or more cores. The system bus 1028 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1026 may include a read-only memory (ROM) 1012 and a random access memory (RAM) 1046. A basic input/output system (BIOS) 1014, containing the basic routines that help transfer information between elements within the computing system 1000, such as during start-up, may be stored in the ROM 1012.

The computing system 1000 may further include a hard disk drive 1050 for reading from and writing to a hard disk, a magnetic disk drive 1052 for reading from and writing to a removable magnetic disk 1056, and an optical disk drive 1054 for reading from and writing to a removable optical disk 1058, such as a CD ROM or other optical media. The hard disk drive 1050, the magnetic disk drive 1052, and the optical disk drive 1054 may be connected to the system bus 1028 by a hard disk drive interface 1056, a magnetic disk drive interface 1058, and an optical drive interface 1050, respectively. The drives and their associated computer-readable media may provide nonvolatile storage of computer-readable instructions, data structures, program modules and other data for the computing system 1000.

Although the computing system 1000 is described herein as having a hard disk, a removable magnetic disk 1056 and a removable optical disk 1058, it should be appreciated by those skilled in the art that the computing system 1000 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1000. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1000 may also include a host adapter 1033 that connects to a storage device 1035 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 1050, magnetic disk 1056, optical disk 1058, ROM 1012 or RAM 1016, including an operating system 1018, one or more application programs 1020, program data 1024, and a database system 1048. The application programs 1020 may include various mobile applications ("apps") and other applications configured to perform various methods and techniques described herein. The operating system 1018 may be any suitable operating system that may control the operation of a networked personal or server computer, such as Windows® XP, Mac OS® X, Unix-variants (e.g., Linux® and BSD®), and the like.

A user may enter commands and information into the computing system 1000 through input devices such as a keyboard 1062 and pointing device 1060. Other input devices may include a microphone, joystick, game pad, satellite dish, scanner, or the like. These and other input devices may be connected to the CPU 1030 through a serial port interface 1042 coupled to system bus 1028, but may be connected by other interfaces, such as a parallel port, game port or a universal serial bus (USB). A monitor 1034 or other type of display device may also be connected to system bus 1028 via an interface, such as a video adapter 1032. In addition to the monitor 1034, the computing system 1000 may further include other peripheral output devices such as speakers and printers.

Further, the computing system 1000 may operate in a networked environment using logical connections to one or more remote computers 1074. The logical connections may be any connection that is commonplace in offices, enterprise-wide computer networks, intranets, and the Internet, such as local area network (LAN) 1056 and a wide area network (WAN) 1066. The remote computers 1074 may be another a computer, a server computer, a router, a network PC, a peer device or other common network node, and may include many of the elements describes above relative to the computing system 1000. The remote computers 1074 may also each include application programs 1070 similar to that of the computer action function.

When using a LAN networking environment, the computing system 1000 may be connected to the local network 1076 through a network interface or adapter 1044. When used in a WAN networking environment, the computing system 1000 may include a router 1064, wireless router or other means for establishing communication over a wide area network 1066, such as the Internet. The router 1064, which may be internal or external, may be connected to the system bus 1028 via the serial port interface 1052. In a networked environment, program modules depicted relative to the computing system 1000, or portions thereof, may be stored in a remote memory storage device 1072. It will be appreciated that the network connections shown are merely examples and other means of establishing a communications link between the computers may be used.

The network interface 1044 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 1074.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 1000 may be located at a data center remote from the survey region. The system computer 1000 may be in communication with the receivers (either directly or via a recording unit, not shown), to receive signals indicative of the reflected seismic energy. These signals, after conventional formatting and other initial processing, may be stored by the system computer 1000 as digital data in the disk storage for subsequent retrieval and processing in the manner described above. In one implementation, these signals and data may be sent to the system computer 1000 directly from sensors, such as geophones, hydrophones and the like. When receiving data directly from the sensors, the system computer 1000 may be described as part of an in-field data processing system. In another implementation, the system computer 1000 may process seismic data already stored in the disk storage. When processing data stored in the disk storage, the system computer 1000 may be described as part of a remote data processing center, separate from data acquisition. The system computer 1000 may be configured to process data as part of the in-field data processing system, the remote data processing system or a combination thereof.

Those with skill in the art will appreciate that any of the listed architectures, features or standards discussed above with respect to the example computing system 1000 may be omitted for use with a computing system used in accordance with the various embodiments disclosed herein because technology and standards continue to evolve over time.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out completely (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary tangible, computer-readable storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method, comprising:
    receiving continuous survey data acquired during an inrun data acquisition using a drop survey tool disposed in a wellbore, wherein the drop survey tool is configured to descend within the wellbore during the inrun data acquisition;
    receiving stationary survey data acquired during an outrun data acquisition using the drop survey tool, wherein the drop survey tool is configured to ascend within the wellbore during the outrun data acquisition;
    combining the continuous survey data and the stationary survey data; and
    generating a continuous survey of the wellbore based on the combination of the continuous survey data and the stationary survey data.

2. The method of claim 1, further comprising determining a tortuosity of the wellbore based on the continuous survey of the wellbore.

3. The method of claim 1, wherein:
    during the inrun data acquisition, the drop survey tool is configured to be dropped within a drill string disposed in the wellbore and to acquire the continuous survey data as it falls within the drill string; and
    during the outrun data acquisition, the drop survey tool is configured to acquire the stationary survey data as the drill string containing the drop survey tool is being retrieved from the wellbore.

4. The method of claim 1, wherein the continuous survey data and the stationary survey data are acquired using one or more gyroscopic sensors and one or more accelerometers of the drop survey tool.

5. The method of claim 1, wherein, during the inrun data acquisition, the drop survey tool is configured to acquire the continuous survey data at depth intervals along the wellbore that are less than or equal to one foot.

6. The method of claim 1, wherein, during the inrun data acquisition, a data sampling frequency of the drop survey tool depends on a rate of descent of the drop survey tool within the drill string.

7. The method of claim 1, wherein, during the inrun data acquisition, a rate of descent of the drop survey tool is controlled based on a rate at which drilling fluid is pumped in the wellbore.

8. The method of claim 1, wherein the continuous survey data comprises depth data acquired during the inrun data acquisition using a casing collar locator.

9. The method of claim 1, wherein, after a predetermined period of time from the start of the inrun data acquisition, the drop survey tool is configured to switch from a continuous survey mode to a stationary survey mode.

10. The method of claim 1, wherein the drop survey tool is configured to switch from a continuous survey mode to a stationary survey mode based on motion detected by one or more gyroscopic sensors and one or more accelerometers of the drop survey tool.

11. The method of claim 1, wherein the stationary survey data comprises depth data acquired during the outrun data acquisition based on the length of a drill string containing the drop survey tool and the length of each section of the drill string.

12. The method of claim 1, wherein combining the continuous survey data and the stationary survey data comprises applying one or more offsets to the continuous survey data to reduce a difference between the continuous survey data and the stationary survey data at the same depths.

13. The method of claim 12, wherein the one or more offsets comprise:
    a first offset used to reduce a difference between a first measurement of the continuous survey data and a first measurement of the stationary survey data;
    a second offset used to reduce a difference between a second measurement of the continuous survey data and a second measurement of the stationary survey data; and a third offset applied to a third measurement of the continuous survey data, wherein the third offset is derived based on the first offset and the second offset.

14. A method, comprising:

acquiring continuous survey data during an inrun data acquisition using a drop survey tool disposed in a wellbore, wherein the drop survey tool is configured to descend within the wellbore during the inrun data acquisition;

acquiring stationary survey data during an outrun data acquisition using the drop survey tool, wherein the drop survey tool is configured to ascend within the wellbore during the outrun data acquisition; and transmitting the continuous survey data and the stationary survey data to a computing system, wherein the computing system is configured to generate a continuous survey of the wellbore based on the continuous survey data and the stationary survey data.

15. The method of claim 14, further comprising:

acquiring the continuous survey data as the drop survey tool falls within a drill string disposed in the wellbore; and acquiring the stationary survey data as the drill string containing the drop survey tool is being retrieved from the wellbore.

16. The method of claim 14, further comprising switching from a continuous survey mode to a stationary survey mode after a predetermined period of time from the start of the inrun data acquisition.

17. The method of claim 14, further comprising switching from a continuous survey mode to a stationary survey mode based on motion detected by one or more gyroscopic sensors and one or more accelerometers of the drop survey tool.

18. A system, comprising:

a drop survey tool disposed in a wellbore, comprising:

one or more sensors configured to acquire continuous survey data during an inrun data acquisition using the drop survey tool, and configured to acquire stationary survey data during an outrun data acquisition using the drop survey tool;

a processor; and a memory comprising a plurality of program instructions which, when executed by the processor, cause the processor to:

receive the continuous survey data acquired during the inrun data acquisition;

receive the stationary survey data acquired during the outrun data acquisition;

combine the continuous survey data and the stationary survey data; and generate a continuous survey of the wellbore based on the combination of the continuous survey data and the stationary survey data.

19. The system of claim 18, wherein the drop survey tool is configured to:

acquire the continuous survey data as the drop survey tool falls within a drill string disposed in the wellbore; and acquire the stationary survey data as the drill string containing the drop survey tool is being retrieved from the wellbore.

20. The system of claim 18, wherein the program instructions which, when executed by the processor, cause the processor to combine the continuous survey data and the stationary survey data further comprise program instructions which, when executed by the processor, cause the processor to apply one or more offsets to the continuous survey data to reduce a difference between the continuous survey data and the stationary survey data at the same depths.

* * * * *